(12) United States Patent
Yamamoto et al.

(10) Patent No.: US 7,889,440 B2
(45) Date of Patent: Feb. 15, 2011

(54) ZOOM LENS, OPTICAL APPARATUS EQUIPPED THEREWITH AND METHOD FOR MANUFACTURING THE ZOOM LENS

(75) Inventors: Hiroshi Yamamoto, Kawasaki (JP); Satoshi Miwa, Yokohama (JP); Takeshi Suzuki, Yokohama (JP); Haruo Sato, Kawaguchi (JP)

(73) Assignee: Nkon Corporation, Tokyo (JP)

( * ) Notice: Subject to any disclaimer, the term of this patent is extended or adjusted under 35 U.S.C. 154(b) by 0 days.

(21) Appl. No.: 12/695,327

(22) Filed: Jan. 28, 2010

(65) Prior Publication Data

US 2010/0220400 A1 Sep. 2, 2010

(30) Foreign Application Priority Data

Jan. 30, 2009 (JP) ............................. 2009-019331
Jan. 30, 2009 (JP) ............................. 2009-019334

(51) Int. Cl.
  *G02B 15/14* (2006.01)
(52) U.S. Cl. ..................... 359/690; 359/557; 359/683; 359/684; 359/685; 359/716; 359/740; 359/785
(58) Field of Classification Search ................ 359/557, 359/676, 683–685, 689, 690, 716, 740, 785
  See application file for complete search history.

(56) References Cited

U.S. PATENT DOCUMENTS

| | | | | |
|---|---|---|---|---|
| 5,654,826 A | * | 8/1997 | Suzuki | ......................... 359/557 |
| 5,731,897 A | * | 3/1998 | Suzuki | ......................... 359/557 |
| 5,892,626 A | * | 4/1999 | Kohno | ......................... 359/676 |
| 6,025,962 A | | 2/2000 | Suzuki | |
| 6,061,180 A | * | 5/2000 | Hayakawa | ................... 359/557 |
| 6,392,816 B1 | | 5/2002 | Hamano | |
| 6,631,034 B2 | | 10/2003 | Yamanashi | |
| 7,196,853 B2 | * | 3/2007 | Nishio et al. | ................. 359/690 |
| 7,242,532 B2 | * | 7/2007 | Shibayama et al. | ......... 359/690 |
| 7,268,955 B2 | * | 9/2007 | Ogata | ........................... 359/690 |
| 7,336,429 B2 | * | 2/2008 | Shibayama | .................. 359/690 |
| 7,450,319 B2 | * | 11/2008 | Ishii et al. | .................... 359/690 |
| 7,580,202 B2 | * | 8/2009 | Wada | ........................... 359/689 |
| 7,663,802 B2 | * | 2/2010 | Mizuguchi | ................... 359/557 |
| 2001/0006433 A1 | * | 7/2001 | Ozaki | ........................... 359/690 |

FOREIGN PATENT DOCUMENTS

| | | |
|---|---|---|
| JP | 10-111456 A | 4/1998 |
| JP | 2001-330777 A | 11/2001 |
| JP | 2001-356270 A | 12/2001 |
| JP | 2007-219315 A | 8/2007 |

* cited by examiner

*Primary Examiner*—Evelyn A. Lester
(74) *Attorney, Agent, or Firm*—Miles & Stockbridge P.C.

(57) ABSTRACT

A zoom lens ZL installed in a single-lens reflex digital camera 1 and the like includes, in order from an object side, a first lens group G1 having positive refractive power, a second lens group G2 having negative refractive power, and a rear lens group GR having positive refractive power. The second lens group G2 includes at least one positive lens and a negative lens disposed adjacent to the object side of the positive lens having largest refractive power among the positive lenses. Each distance between lens groups varies upon zooming from a wide-angle end state and a telephoto end state. Thereby providing a zoom lens having excellent optical performance, an optical apparatus equipped the zoom lens, and a method for manufacturing the zoom lens.

24 Claims, 15 Drawing Sheets

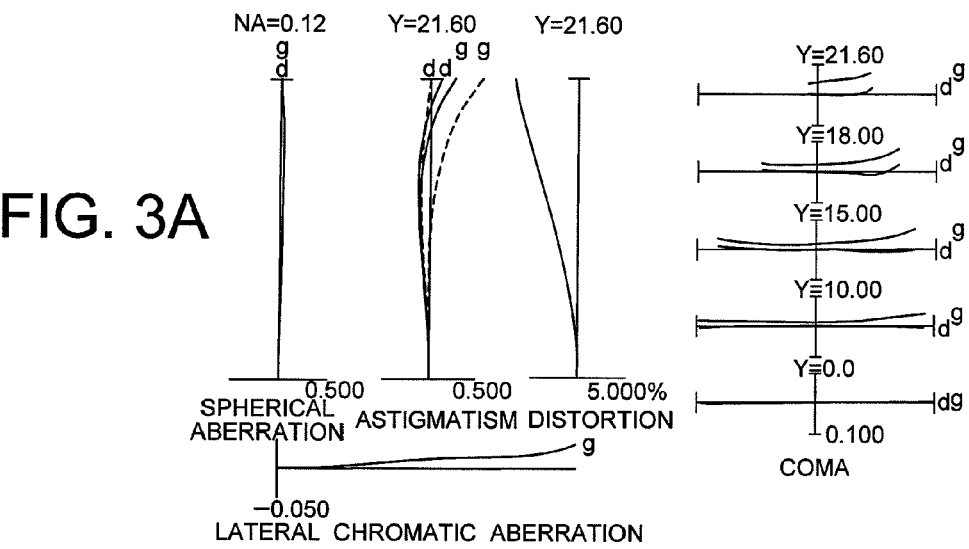
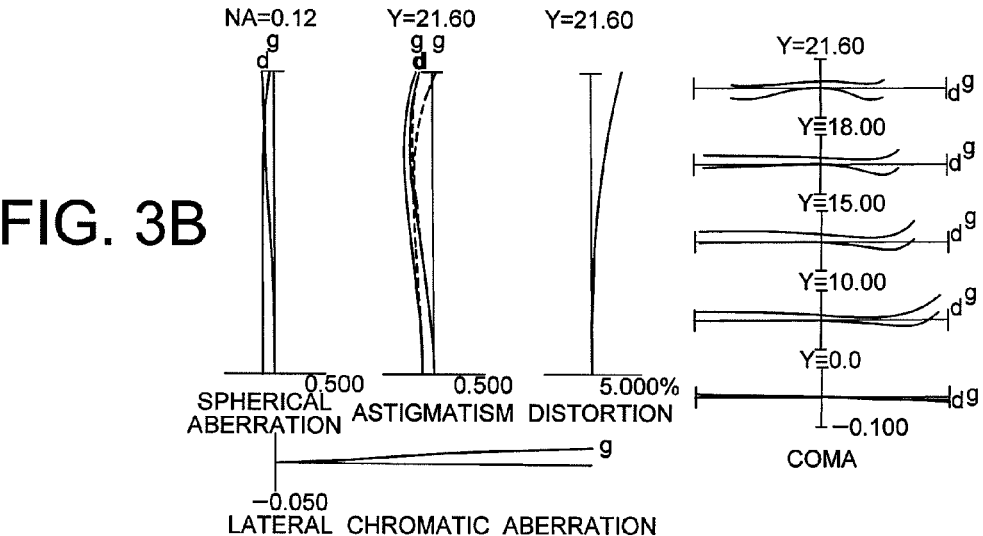
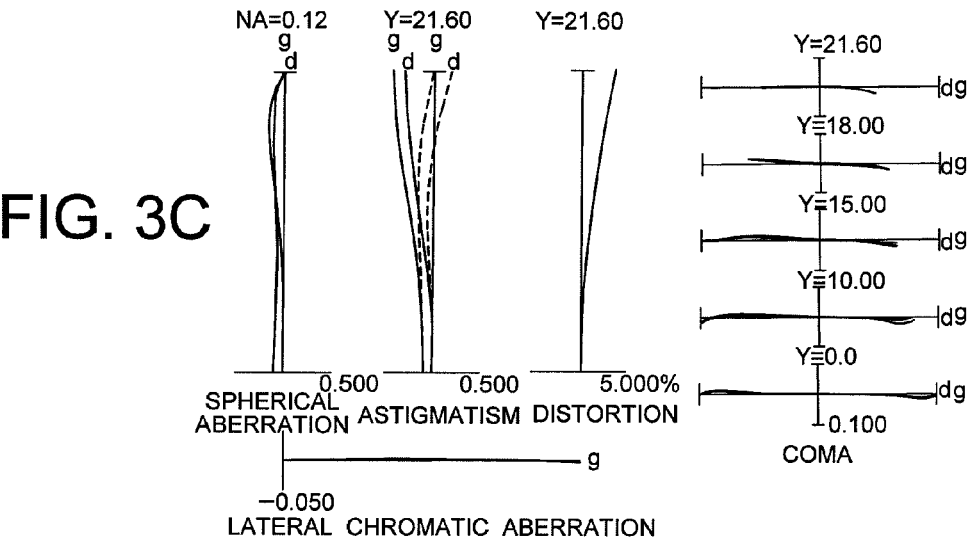

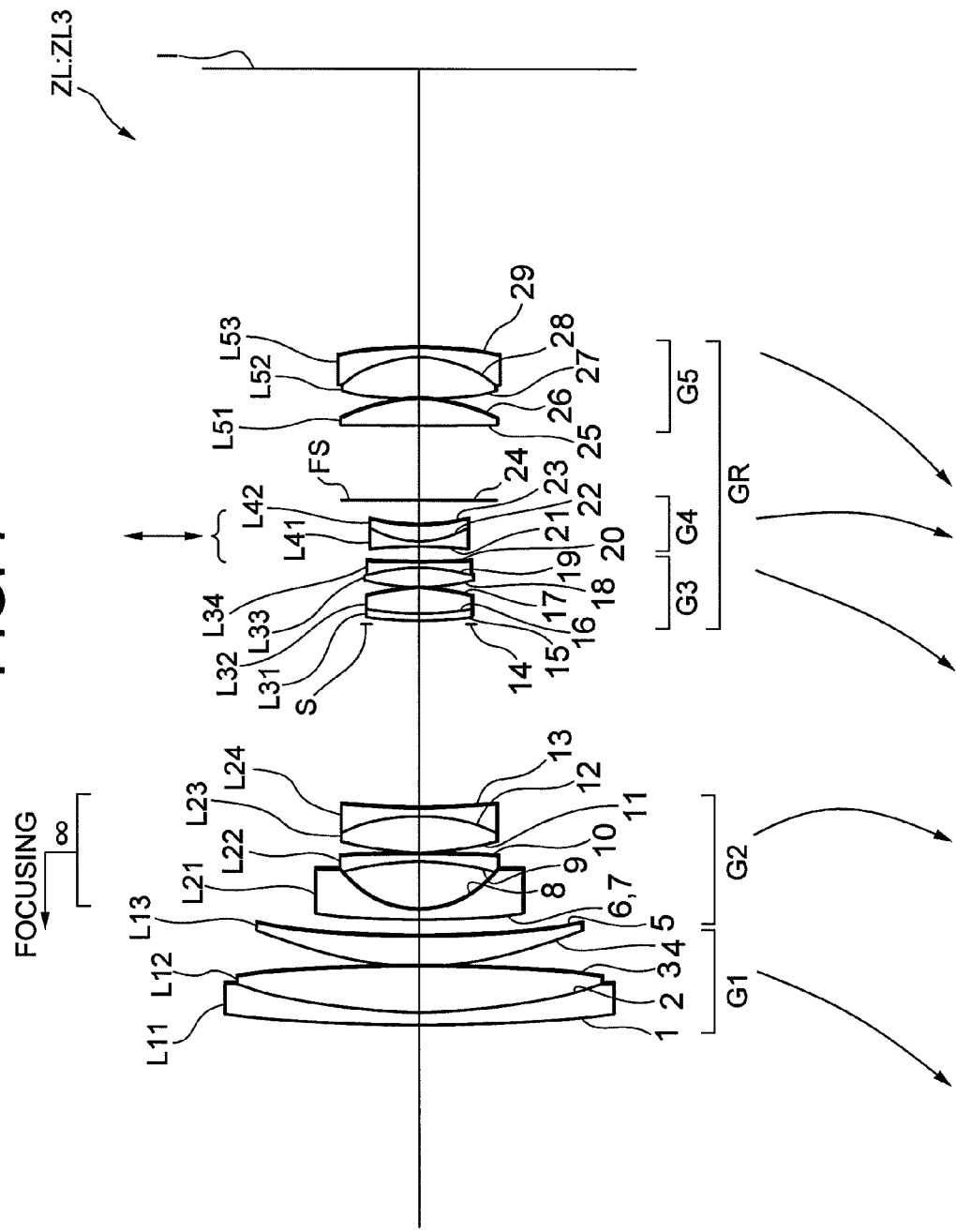

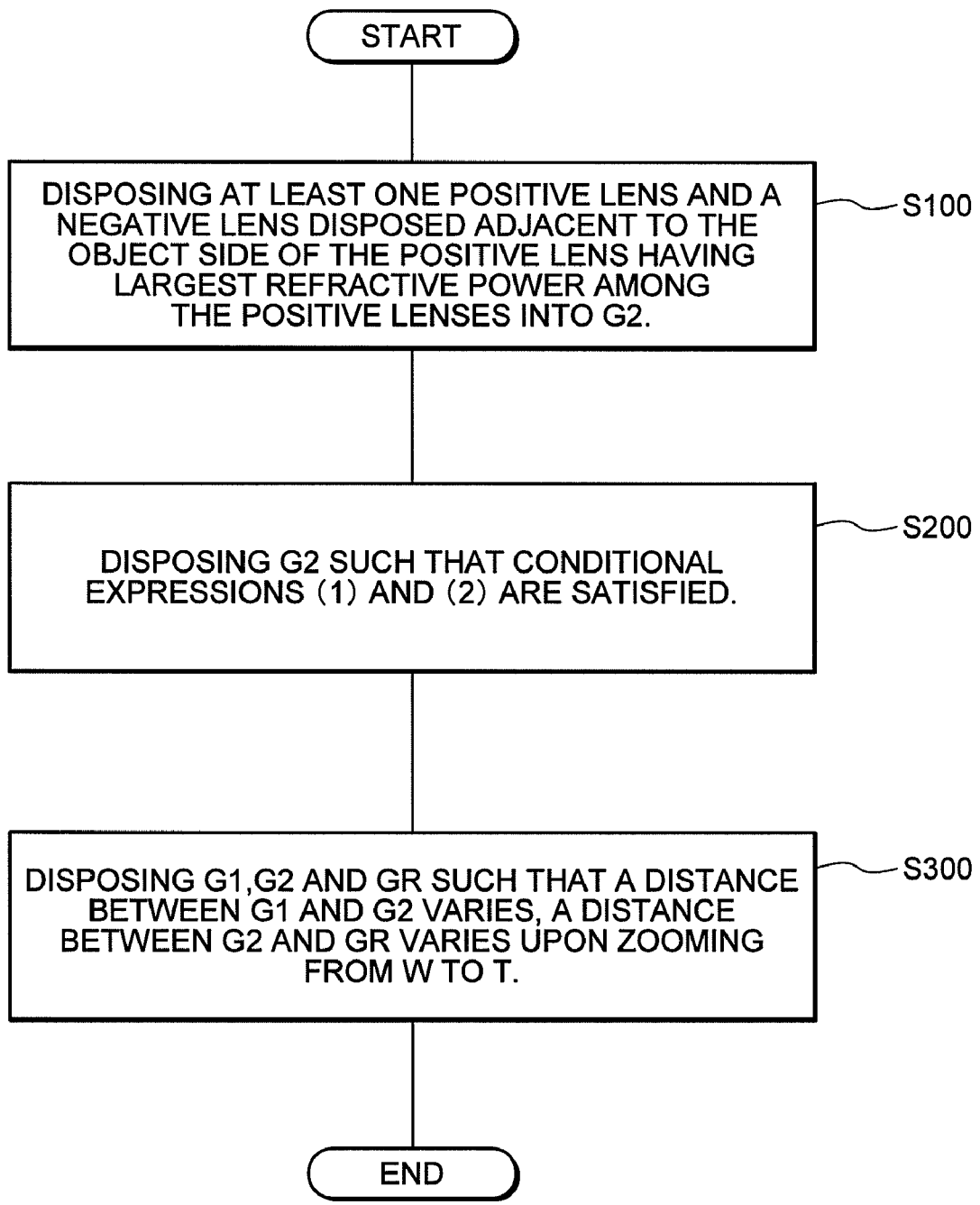

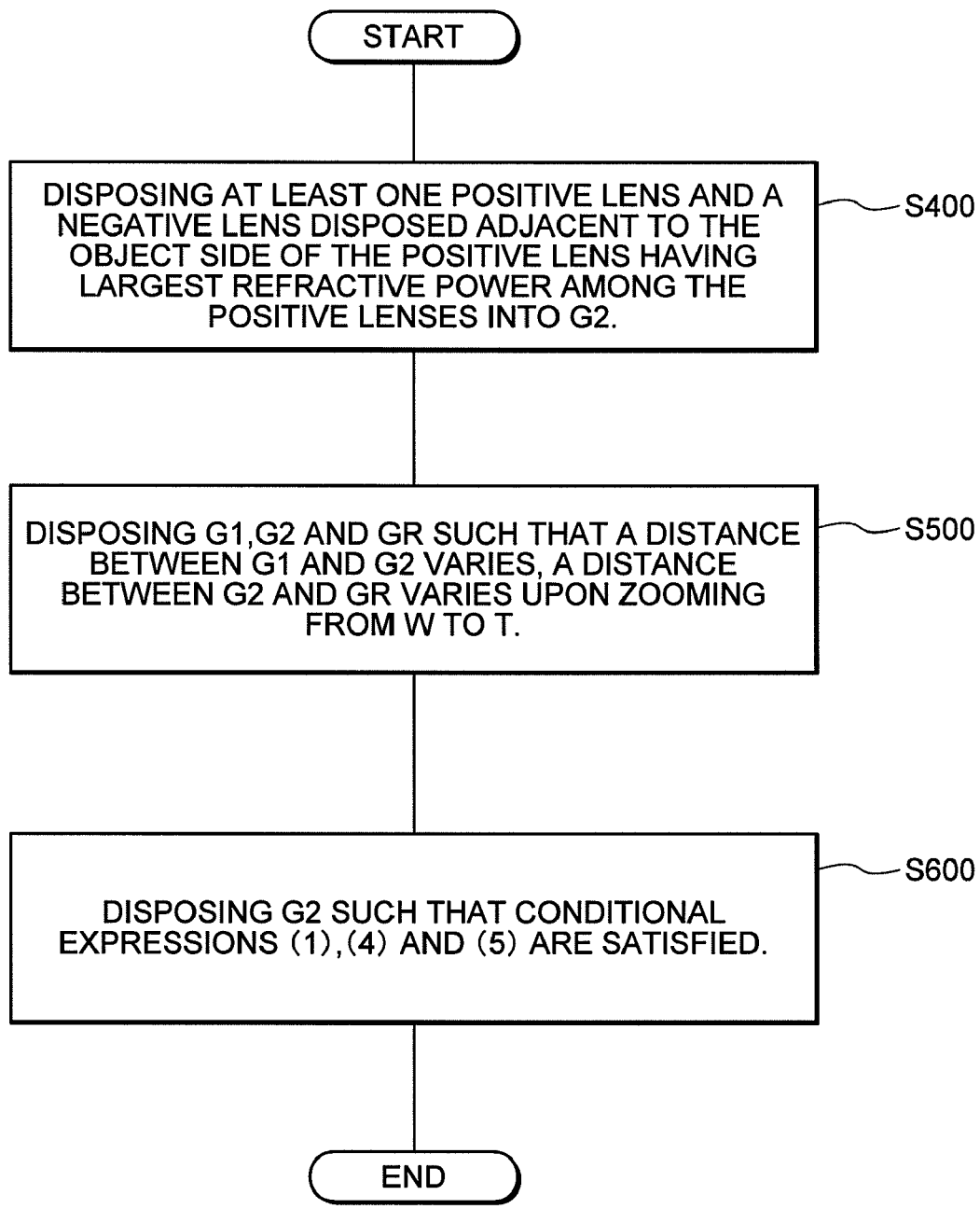

ZOOM LENS, OPTICAL APPARATUS EQUIPPED THEREWITH AND METHOD FOR MANUFACTURING THE ZOOM LENS

The disclosure of the following priority applications are herein incorporated by reference:

Japanese Patent Application No. 2009-019331 filed on Jan. 30, 2009, and

Japanese Patent Application No. 2009-019334 filed on Jan. 30, 2009.

BACKGROUND OF THE INVENTION

1. Field of the Invention

The present invention relates to a zoom lens, an optical apparatus equipped with the zoom lens, and a method for manufacturing the zoom lens.

2. Related Background Art

There have been proposed zoom lenses suitable for a film camera, an electronic still camera, a video camera, and the like disclosed in such as Japanese Patent Application Laid-Open No. 2001-330777.

However, a zoom lens having better optical performance than a conventional one has been desired.

SUMMARY OF THE INVENTION

The present invention is made in view of the above-described desire, and has an object to provide a zoom lens capable of accomplish better optical performance, an optical apparatus equipped with the zoom lens, and a method for manufacturing the zoom lens.

According to a first aspect of the present invention, there is provided a zoom lens comprising, in order from an object: a first lens group having positive refractive power; a second lens group having negative refractive power; and a rear lens group having positive refractive power; the second lens group including at least one positive lens and a negative lens disposed adjacent to the object side of the positive lens having largest refractive power among the positive lenses, upon zooming from a wide-angle end state to a telephoto end state, a distance between the first lens group and the second lens group varying, and a distance between the second lens group and the rear lens group varying, and the following conditional expressions (1) and (2) being satisfied:

$$0.80 < (r2+r1)/(r2-r1) < 3.50 \quad (1)$$

$$0.50 < (-f2)/fw < 0.90 \quad (2)$$

where r1 denotes a radius of curvature of the object side lens surface of the negative lens in the second lens group, r2 denotes a radius of curvature of the image side lens surface of the negative lens in the second lens group, fw denotes a focal length of the zoom lens in the wide-angle end state, and f2 denotes a focal length of the second lens group.

In the first aspect of the present invention, it is preferable that at least one portion of the second lens group moves along an optical axis upon focusing from infinity to a close object.

In the first aspect of the present invention, it is preferable that the rear lens group includes, in order from the object side, a third lens group having positive refractive power, a fourth lens group having negative refractive power, and a fifth lens group having positive refractive power.

In the first aspect of the present invention, it is preferable that the rear lens group includes, in order from the object side, a third lens group having positive refractive power, and a fourth lens group having positive refractive power.

In the first aspect of the present invention, it is preferable that the most image side lens surface of the second lens group is an aspherical surface.

In the first aspect of the present invention, it is preferable that the following conditional expression (3) is satisfied:

$$2.00 < f1/|f4| < 6.00 \quad (3)$$

where f1 denotes a focal length of the first lens group and f4 denotes a focal length of the fourth lens group.

In the first aspect of the present invention, it is preferable that a portion of the rear lens group moves in a direction including a component substantially perpendicular to the optical axis.

In the first aspect of the present invention, it is preferable that at least a portion of the fourth lens group moves in a direction including a component substantially perpendicular to the optical axis.

In the first aspect of the present invention, it is preferable that the most object side lens surface of the second lens group is an aspherical surface.

In the first aspect of the present invention, it is preferable that upon zooming from the wide-angle end state to the telephoto end state, a distance between the first lens group and the second lens group increases, and a distance between the second lens group and the rear lens group decreases.

In the first aspect of the present invention, it is preferable that the following conditional expression (4) is satisfied:

$$0.30 < (-f2)/BFw < 0.60 \quad (4)$$

where f2 denotes a focal length of the second lens group, and BFw denotes a back focal length in the wide-angle end state.

In the first aspect of the present invention, it is preferable that the following conditional expression (5) is satisfied:

$$0.45 < fw/BFw < 0.80 \quad (5)$$

where fw denotes a focal length of the zoom lens in the wide-angle end state, and BFw denotes a back focal length in the wide-angle end state.

According to a second aspect of the present invention, there is provided an optical apparatus equipped with the zoom lens according to the first aspect.

According to a third aspect of the present invention, there is provided a zoom lens comprising, in order from an object: a first lens group having positive refractive power; a second lens group having negative refractive power; and a rear lens group having positive refractive power; the second lens group including at least one positive lens and a negative lens disposed adjacent to the object side of the positive lens having largest refractive power among the positive lenses, upon zooming from a wide-angle end state to a telephoto end state, a distance between the first lens group and the second lens group varying, and a distance between the second lens group and the rear lens group varying, and the following conditional expressions (1), (4) and (5) being satisfied:

$$0.80 < (r2+r1)/(r2-r1) < 3.50 \quad (1)$$

$$0.30 < (-f2)/BFw < 0.60 \quad (4)$$

$$0.45 < fw/BFw < 0.80 \quad (5)$$

where r1 denotes a radius of curvature of the object side surface of the negative lens in the second lens group, r2 denotes a radius of curvature of the image side surface of the negative lens in the second lens group, fw denotes a focal length of the zoom lens in the wide-angle end state, f2 denotes a focal length of the second lens group, and BFw denotes a back focal length in the wide-angle end state.

In the third aspect of the present invention, it is preferable that the following conditional expression (2) is satisfied:

$$0.50<(-f2)/fw<0.90 \quad (2)$$

where fw denotes a focal length of the zoom lens in the wide-angle end state, and f2 denotes a focal length of the second lens group.

In the third aspect of the present invention, it is preferable that the rear lens group includes, in order from the object side, a third lens group having positive refractive power, a fourth lens group having negative refractive power, and a fifth lens group having positive refractive power.

In the third aspect of the present invention, it is preferable that the rear lens group includes, in order from the object side, a third lens group having positive refractive power, and a fourth lens group having positive refractive power.

In the third aspect of the present invention, it is preferable that the following conditional expression (3) is satisfied:

$$2.00<f1/|f4|<6.00 \quad (3)$$

where f1 denotes a focal length of the first lens group and f4 denotes a focal length of the fourth lens group.

According to a fourth aspect of the present invention, there is provided an optical apparatus equipped with the zoom lens according to the third aspect.

According to a fifth aspect of the present invention, there is provided a method for manufacturing a zoom lens that includes, in order from an object side, a first lens group having positive refractive power, a second lens group having negative refractive power, and a rear lens group having positive refractive power, the method comprising steps of: providing in the second lens group at least one positive lens and a negative lens disposed adjacent to the object side of the positive lens having largest refractive power among the positive lenses; providing the first lens group, the second lens group and the rear lens group such that a distance between the first lens group and the second lens group varies, and a distance between the second lens group and the rear lens group varies upon zooming from a wide-angle end state to a telephoto end state; providing the second lens group with satisfying the following conditional expressions (1) and (2):

$$0.80<(r2+r1)/(r2-r1)<3.50 \quad (1)$$

$$0.50<(-f2)/fw<0.90 \quad (2)$$

where r1 denotes a radius of curvature of the object side surface of the negative lens in the second lens group, r2 denotes a radius of curvature of the image side lens surface of the negative lens in the second lens group, fw denotes a focal length of the zoom lens in the wide-angle end state, and f2 denotes a focal length of the second lens group.

In the fifth aspect of the present invention, the following step preferably being included:

providing, in order from the object side, a third lens group having positive refractive power, a fourth lens group having negative refractive power, and a fifth lens group having positive refractive power into the rear lens group.

In the fifth aspect of the present invention, the following step preferably being included:

providing, in order from the object side, a third lens group having positive refractive power, and a fourth lens group having positive refractive power into the rear lens group.

In the fifth aspect of the present invention, the following step preferably being included:

providing the fourth lens group with satisfying the following conditional expression:

$$2.00<f1/|f4|<6.00$$

where f1 denotes a focal length of the first lens group and f4 denotes a focal length of the fourth lens group.

According to a sixth aspect of the present invention, there is provided a method for manufacturing a zoom lens that includes, in order from an object side, a first lens group having positive refractive power, a second lens group having negative refractive power, and a rear lens group having positive refractive power, the method comprising steps of: providing in the second lens group at least one positive lens and a negative lens disposed adjacent to the object side of the positive lens having largest refractive power among the positive lenses; providing the first lens group, the second lens group and the rear lens group such that a distance between the first lens group and the second lens group varies, and a distance between the second lens group and the rear lens group varies upon zooming from a wide-angle end state to a telephoto end state; providing the second lens group with satisfying the following conditional expressions (1), (4) and (5):

$$0.80<(r2+r1)/(r2-r1)<3.50 \quad (1)$$

$$0.30<(-f2)/BFw<0.60 \quad (4)$$

$$0.45<fw/BFw \quad (5)$$

where r1 denotes a radius of curvature of the object side surface of the negative lens in the second lens group, r2 denotes a radius of curvature of the image side surface of the negative lens in the second lens group, fw denotes a focal length of the zoom lens in the wide-angle end state, f2 denotes a focal length of the second lens group, and BFw denotes a back focal length in the wide-angle end state.

With configuring a zoom lens system, an optical apparatus and a method for manufacturing the zoom lens system according to the present invention as described above, it becomes possible to accomplish excellent optical performance.

BRIEF DESCRIPTION OF THE DRAWINGS

FIGS. 2A, 2B and 2C are graphs showing various aberrations of the zoom lens according to Example 1 focusing on infinity, in which FIG. 2A shows various aberrations in a wide-angle end state, FIG. 2B shows various aberrations in an intermediate focal length state, and FIG. 2C shows various aberrations in a telephoto end state.

FIGS. 3A, 3B and 3C are graphs showing various aberrations of the zoom lens according to Example 1 focusing on a closest shooting range, in which FIG. 3A shows various aberrations in the wide-angle end state, FIG. 3B shows various aberrations in the intermediate focal length state, and FIG. 3C shows various aberrations in the telephoto end state.

FIGS. 5A, 5B and 5C are graphs showing various aberrations of the zoom lens according to Example 2 focusing on infinity, in which FIG. 5A shows various aberrations in a wide-angle end state, FIG. 5B shows various aberrations in an intermediate focal length state, and FIG. 5C shows various aberrations in a telephoto end state.

FIGS. 6A, 6B and 6C are graphs showing various aberrations of the zoom lens according to Example 2 focusing on a closest shooting range, in which FIG. 6A shows various aberrations in the wide-angle end state, FIG. 6B shows various aberrations in the intermediate focal length state, and FIG. 6C shows various aberrations in the telephoto end state.

FIG. 7 is a sectional view showing a lens configuration of a zoom lens according to Example 3.

FIGS. 8A, 8B and 8C are graphs showing various aberrations of the zoom lens according to Example 3 focusing on infinity, in which FIG. 8A shows various aberrations in a wide-angle end state, FIG. 8B shows various aberrations in an intermediate focal length state, and FIG. 8C shows various aberrations in a telephoto end state.

FIGS. 9A, 9B and 9C are graphs showing various aberrations of the zoom lens according to Example 3 focusing on a closest shooting range, in which FIG. 9A shows various aberrations in the wide-angle end state, FIG. 9B shows various aberrations in the intermediate focal length state, and FIG. 9C shows various aberrations in the telephoto end state.

FIGS. 11A, 11B and 11C are graphs showing various aberrations of the zoom lens according to Example 4 focusing on infinity, in which FIG. 11A shows various aberrations in a wide-angle end state, FIG. 11B shows various aberrations in an intermediate focal length state, and FIG. 11C shows various aberrations in a telephoto end state.

FIGS. 12A, 12B and 12C are graphs showing various aberrations of the zoom lens according to Example 4 focusing on a closest shooting range, in which FIG. 12A shows various aberrations in the wide-angle end state, FIG. 12B shows various aberrations in the intermediate focal length state, and FIG. 12C shows various aberrations in the telephoto end state.

FIG. 14 is a flowchart schematically explaining a method for manufacturing the zoom lens according to the present embodiment.

FIG. 15 is a flowchart schematically explaining a method for manufacturing the zoom lens seen form another point of view according to the present embodiment.

DESCRIPTION OF THE MOST PREFERRED EMBODIMENT

Figure 1:
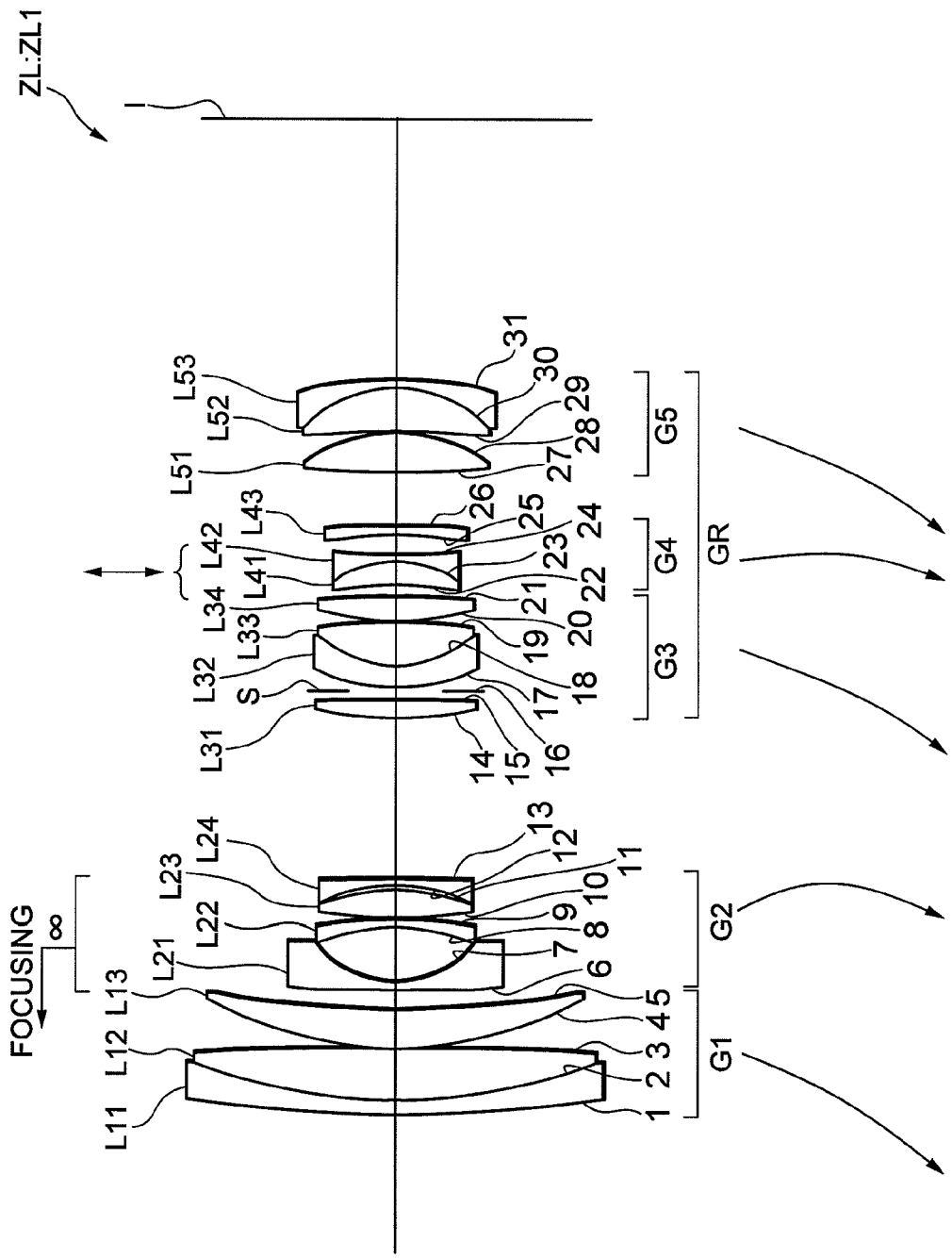
FIG. 1 is a sectional view showing a lens configuration of a zoom lens according to Example 1.

A preferred embodiment according to the present application is explained with reference to accompanying drawings. As shown in FIG. 1, a zoom lens ZL according to the present embodiment includes, in order from an object side, a first lens group G1 having positive refractive power, a second lens group G2 having negative refractive power, and a rear lens group GR having positive refractive power. The second lens group G2 includes at least one positive lens, and a negative lens disposed adjacent to the object side of the positive lens having largest refractive power among the positive lenses. A distance between the first lens group and the second lens group varies and a distance between the second lens group and the rear lens group varies, upon zooming from a wide-angle end state to a telephoto end state. With this lens configuration, it becomes possible to make the lens barrel compact and to excellently correct variation in aberrations upon zooming and focusing.

Then, conditions for configuring the zoom lens ZL are explained. At first the following conditional expression (1) and (2) are preferably satisfied:

$$0.80 < (r2+r1)/(r2-r1) < 3.50 \qquad (1)$$

$$0.50 < (-f2)/fw < 0.90 \qquad (2)$$

where r1 denotes a radius of curvature of the object side lens surface of the negative lens in the second lens group, r2 denotes a radius of curvature of the image side lens surface of the negative lens in the second lens group.

Conditional expression (1) defines a shape of a negative lens disposed adjacent to the object side of the positive lens having largest refractive power in the second lens group G2. With satisfying conditional expression (1), a zoom lens according to the present embodiment makes it possible to realize excellent optical performance. When the ratio (r2+r1)/(r2−r1) is equal to or exceeds the upper limit of conditional expression (1), the radius of curvature of the object side lens surface of the negative lens becomes large, coma in the wide-angle end state becomes difficult to be corrected, so that it is undesirable. In order to secure the effect of the present application, it is preferable to set the upper limit of conditional expression (1) to 3.00. On the other hand, when the ratio (r2+r1)/(r2−r1) is equal to or falls below the lower limit of conditional expression (1), the radius of curvature of the object side lens surface of the negative lens becomes small, spherical aberration in the telephoto end state becomes difficult to be corrected, and the effect of manufacturing error of the distance between the negative lens and the positive lens becomes large, so that it is undesirable. In order to secure the effect of the present application, it is preferable to set the lower limit of conditional expression (1) to 0.90.

Conditional Expression (2) defines the ratio of the focal length f2 of the second lens group G2 to the focal length fw of the zoom lens in the wide-angle end state. With satisfying conditional expression (2), a zoom lens ZL according to the present embodiment makes it possible to realize a given zoom ratio and excellent optical performance. When the ratio (−f2)/fw is equal to or exceeds the upper limit of conditional expression (2), refractive power of the second lens group G2 becomes weak, so that refractive power of the other lens groups have to be strong in order to obtain a given zoom ratio. As a result, spherical aberration and curvature of field become worse, so that it is undesirable. In order to secure the effect of the present application, it is preferable to set the upper limit of conditional expression (2) to 0.85. On the other hand, when the ratio (−f2)/fw is equal to or falls below the lower limit of conditional expression (2), refractive power of the second lens group G2 becomes strong, spherical aberration and coma in the telephoto end state become difficult to correct, so that it is undesirable. In order to secure the effect of the present application, it is preferable to set the lower limit of conditional expression (2) to 0.60.

In a zoom lens ZL according to the present embodiment, it is preferable that a distance between the first lens group G1 and the second lens group G2 increases, and a distance between the second lens group G2 and the rear lens group GR decreases upon zooming from the wide-angle end state to the telephoto end state. With this lens configuration, it becomes possible to secure a given zoom ratio with effectively correcting variation in spherical aberration and curvature of field.

In a zoom lens ZL according to the present embodiment, it is preferable that at least a portion of the second lens group G2 is disposed movable along the optical axis upon focusing from infinity to a close object. With this lens configuration, it becomes possible to make the lens barrel compact and to excellently correct variation in spherical aberration and curvature of field.

In a zoom lens ZL according to the present embodiment, the rear lens group GR preferably includes, in order from the object side, a third lens group G3 having positive refractive power, a fourth lens group G4 having negative refractive power, and a fifth lens group G5 having positive refractive power. With this lens configuration, it becomes possible to secure a given zoom ratio with effectively correcting variation in spherical aberration and curvature of field.

In a zoom lens ZL according to the present embodiment, the rear lens group GR preferably includes, in order from the object side, a third lens group G3 having positive refractive power, and a fourth lens group G4 having positive refractive power. With this lens configuration, it becomes possible to secure a given zoom ratio with effectively correcting variation in spherical aberration and curvature of field.

In a zoom lens ZL according to the present embodiment, the most image side lens surface of the second lens group G2 is preferably an aspherical surface. With this lens configuration, spherical aberration in the telephoto end state can be excellently corrected.

In a zoom lens ZL according to the present embodiment, the following conditional expression (3) is preferably satisfied:

$$2.00 < f1/|f4| < 6.00 \quad (3)$$

where f1 denotes a focal length of the first lens group G1, and f4 denotes a focal length of the fourth lens group G4.

Conditional expression (3) defines a focal length f4 of the fourth lens group G4 with respect to that f1 of the first lens group G1. With satisfying conditional expression (3), a zoom lens ZL according to the present embodiment makes it possible to secure a given zoom ratio with securing optical performance upon carrying out vibration reduction. When the ratio f1/|f4| is equal to or exceeds the upper limit of conditional expression (3), refractive power of the fourth lens group G4 becomes strong, so that it becomes difficult to correct both of variation in curvature of field and variation in decentering coma upon carrying out vibration reduction at the same time. Accordingly, it is undesirable. In order to secure the effect of the present application, it is preferable to set the upper limit of conditional expression (3) to 5.54. On the other hand, when the ratio f1/|f4| is equal to or falls below the lower limit of conditional expression (3), refractive power of the first lens group G1 becomes strong, so that it becomes difficult to correct spherical aberration in the telephoto end state. Moreover, deterioration in lateral chromatic aberration in the wide-angle end state becomes conspicuous, so that it is undesirable. In order to secure the effect of the present application, it is preferable to set the lower limit of conditional expression (3) to 3.55.

In a zoom lens ZL according to the present embodiment, a portion of the rear lens group GR is preferably movable in a direction including a component substantially perpendicular to the optical axis. With this lens configuration, it becomes possible to correct both of variation in curvature of field and variation in decentering coma upon carrying out vibration reduction at the same time.

In a zoom lens ZL according to the present embodiment, at least a portion of the fourth lens group G4 is preferably movable in a direction including a component substantially perpendicular to the optical axis. With this lens configuration, it becomes possible to correct both of variation in curvature of field and variation in decentering coma upon carrying out vibration reduction at the same time with making the lens barrel compact.

In a zoom lens ZL according to the present embodiment, the most object side lens surface of the second lens group G2 is preferably an aspherical surface. With this lens configuration, it becomes possible to excellently correct curvature of field and distortion in the wide-angle end state.

An outline of a method for manufacturing a zoom lens according to the present embodiment is explained below with reference to FIG. 14.

At first, at least one positive lens and a negative lens disposed adjacent to the object side of the positive lens having largest refractive power among the positive lenses are disposed in the second lens group G2 (Step S100).

On this occasion, the second lens group G2 is disposed such that the following conditional expressions (1) and (2) are satisfied:

$$0.80 < (r2+r1)/(r2-r1) < 3.50 \quad (1)$$

$$0.50 < (-f2)/fw < 0.90 \quad (2)$$

where r1 denotes a radius of curvature of the object side lens surface of the negative lens in the second lens group, r2 denotes a radius of curvature of the image side lens surface of the negative lens in the second lens group (Step S200).

Then, a first lens group G1, the second lens group G2, and a rear lens group GR are disposed such that a distance between the first lens group G1 and the second lens group G2 varies and a distance between the second lens group and the rear lens group varies, upon zooming from a wide-angle end state to a telephoto end state (Step S300).

Then, a zoom lens ZL seen from another point of view according to the present application is explained below with reference to accompanying drawings. As shown in FIG. 1, a zoom lens ZL seen from another point of view according to the present application includes, in order from an object side, a first lens group G1 having positive refractive power, a second lens group G2 having negative refractive power, and a rear lens group GR having positive refractive power. The second lens group G2 includes at least one positive lens, and a negative lens disposed adjacent to the object side of the positive lens having largest refractive power among the positive lenses. A distance between the first lens group and the second lens group varies and a distance between the second lens group and the rear lens group varies, upon zooming from a wide-angle end state to a telephoto end state. With this lens configuration, it becomes possible to make the lens barrel compact and to excellently correct variation in aberrations upon zooming and focusing.

Then, conditions for constructing a zoom lens ZL seen from another point of view according to the present application are explained. In a zoom lens ZL seen from another point of view according to the present application, each distance between lens groups is varied, and the following conditional expressions (1), (4) and (5) are satisfied upon zooming from a wide-angle end state to a telephoto end state:

$$0.80 < (r2+r1)/(r2-r1) < 3.50 \quad (1)$$

$$0.30 < (-f2)/BFw < 0.60 \quad (4)$$

$$0.45 < fw/BFw < 0.80 \quad (5)$$

where r1 denotes a radius of curvature of the object side surface of the negative lens in the second lens group G2, r2 denotes a radius of curvature of the image side surface of the negative lens in the second lens group G2, fw denotes a focal length of the zoom lens in the wide-angle end state, f2 denotes a focal length of the second lens group G2, and BFw denotes a back focal length in the wide-angle end state.

Conditional expression (1) defines a shape of the negative lens adjacent to the object side of the positive lens having largest refractive power in the second lens group G2. However, conditional expression (1) has already been explained, so that duplicated explanations are omitted.

Conditional expression (4) defines a ratio of the focal length f2 of the second lens group G2 to a back focal length BFw in the wide-angle end state. With satisfying conditional expression (4), a zoom lens ZL seen from another point of view according to the present application makes it possible to realize excellent optical performance and a given zoom ratio with securing effective back focal length. When the ratio (−f2)/BFw is equal to or exceeds the upper limit of conditional expression (4), refractive power of the second lens group G2 becomes weak, so that in order to obtain effective back focal length in the wide-angle end state, refractive power of the other lens groups has to be large. As a result, spherical aberration and curvature of field become worse, so that it is undesirable. In order to secure the effect of the present application, it is preferable to set the upper limit of conditional expression (4) to 0.55. On the other hand, when the ratio (−f2)/BFw is equal to or falls below the lower limit of conditional expression (4), refractive power of the second lens group G2 becomes strong, so that it becomes difficult to correct spherical aberration and coma in the telephoto end state. Accordingly, it is undesirable. In order to secure the effect of the present application, it is preferable to set the lower limit of conditional expression (4) to 0.35.

Conditional expression (5) defines the ratio of the focal length fw of the zoom lens in the wide-angle end state to the back focal length BFw in the wide-angle end state. With satisfying conditional expression (5), a zoom lens ZL seen from another point of view according to the present application makes it possible to secure effective back focal length in the wide-angle end state with securing a given zoom ratio. When the ratio fw/BFw is equal to or exceeds the upper limit of conditional expression (5), back focal length in the wide-angle end state becomes too short, spherical aberration becomes worse, and effective back focal length becomes difficult to be secured, so that it is undesirable. In order to secure the effect of the present application, it is preferable to set the upper limit of conditional expression (5) to 0.77. On the other hand, when the ratio fw/BFw is equal to or falls below the lower limit of conditional expression (5), the focal length in the wide-angle end state becomes too short, so that it becomes difficult to correct curvature of field and coma in the wide-angle end state. Accordingly, it is undesirable. In order to secure the effect of the present application, it is preferable to set the lower limit of conditional expression (5) to 0.47.

Then, an outline of a method for manufacturing a zoom lens seen from said another point of view according to the present application is explained with reference to FIG. 15.

At first, at least one positive lens and a negative lens disposed adjacent to the object side of the positive lens having largest refractive power among the positive lenses are disposed in the second lens group G2 (Step S400).

On this occasion, the first lens group G1, the second lens group G2 and the rear lens group GR are disposed such that a distance between the first lens group G1 and the second lens group G2 varies and a distance between the second lens group G2 and the rear lens group GR varies, upon zooming from the wide-angle end state to the telephoto end state (Step S500).

Then, the second lens group G2 is disposed such that the following conditional expressions (1), (4) and (5) are satisfied:

$$0.80 < (r2+r1)/(r2-r1) < 3.50 \quad (1)$$

$$0.30 < (-f2)/BFw < 0.60 \quad (4)$$

$$0.45 < fw/BFw < 0.80 \quad (5)$$

where r1 denotes a radius of curvature of the object side surface of the negative lens in the second lens group G2, r2 denotes a radius of curvature of the image side surface of the negative lens in the second lens group G2, fw denotes a focal length of the zoom lens in the wide-angle end state, f2 denotes a focal length of the second lens group G2, and BFw denotes a back focal length in the wide-angle end state (Step S600).

Figure 4:
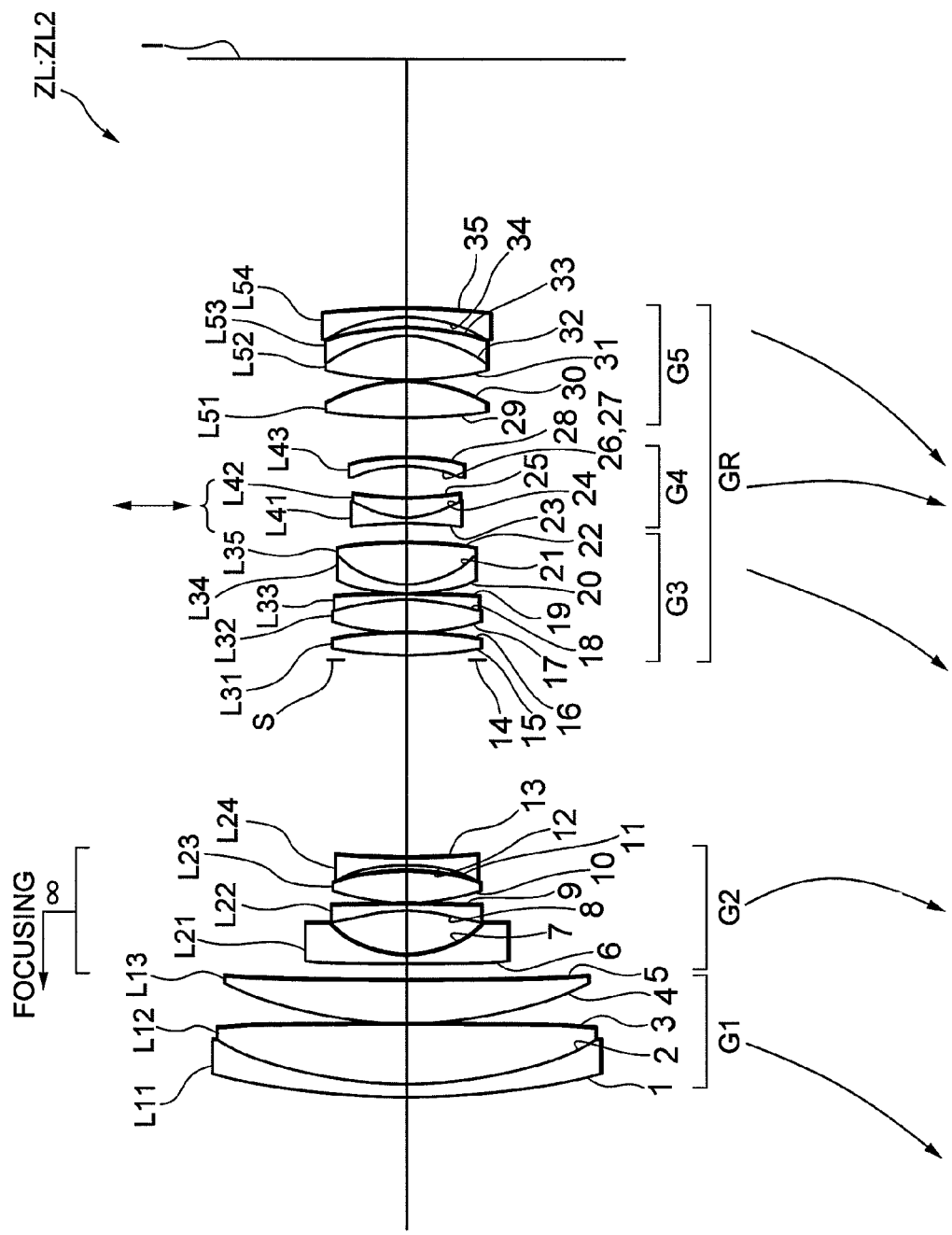
FIG. 4 is a sectional view showing a lens configuration of a zoom lens according to Example 2.

Each Example of the present application is explained below with reference to accompanying drawings. FIGS. 1, 4, 7 and 10 are sectional views showing lens configurations and moving trajectories upon zooming from of each lens group of zoom lenses ZL (ZL1 through ZL4), respectively. As shown in FIGS. 1, 4 and 7, zoom lenses ZL1 through ZL3 according to Example 1 through 3, respectively, are composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power. Upon zooming from a wide-angle end state to a telephoto end state, each distance between lens groups varies such that a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

Figure 10:
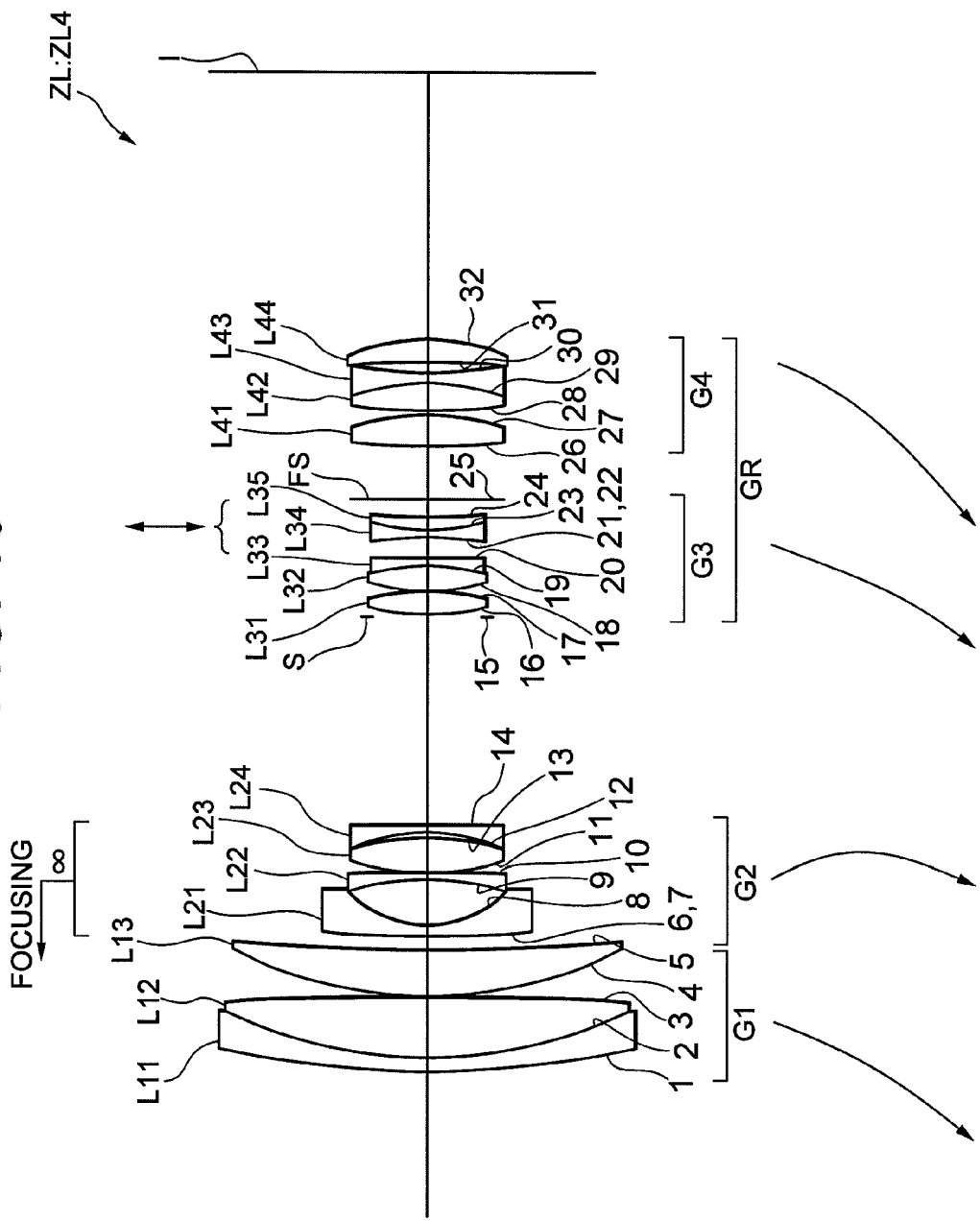
FIG. 10 is a sectional view showing a lens configuration of a zoom lens according to Example 4.

As shown in FIG. 10, the zoom lens ZL4 according to Example 4 is composed of, in order from an object side, a first lens group G1 having positive refractive power, a second lens group G2 having negative refractive power, a third lens group G3 having positive refractive power, and a fourth lens group G4 having positive refractive power. Upon zooming from a wide-angle end state to a telephoto end state, each distance between lens groups varies such that a distance between the first lens group G1 and the second lens group G2 increases, a distance between the second lens group G2 and the third lens group G3 decreases, and a distance between the third lens group G3 and the fourth lens group G4 decreases.

In each Example, an aspherical surface is expressed by the following expression (a):

$$S(y)=(y^2/r)/[1+\{1-\kappa \times (y/r)^2\}^{1/2}]+A4 \times y^4+A6 \times y^6+A8 \times y^8+A10 \times y^{10} \quad (a)$$

where y denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order. In the following Examples, "E-n" denotes "×10⁻ⁿ", and aspherical coefficient of the second order A2 is zero. In [Lens Data], an aspherical surface is shown by attaching "*" to the left side of the surface number.

EXAMPLE 1

FIG. 1 is a sectional view showing a lens configuration of a zoom lens ZL1 according to Example 1 of the present application. In the zoom lens ZL1 shown in FIG. 1, the first lens group G1 is composed of, in order from an object side, a cemented positive lens constructed by a negative meniscus lens L11 having a convex surface facing the object side cemented with a double convex positive lens L12, and a positive meniscus lens L13 having a convex surface facing the object side. The second lens group G2 is composed of, in order from the object side, a negative meniscus lens L21 having an aspherical surface facing the object side and a convex surface facing the object side, a negative meniscus lens L22 having a concave surface facing the object side, a double convex positive lens L23, and a double concave negative lens L24 having an aspherical surface facing the image side. The third lens group G3 is composed of, in order from the object side, a double convex positive lens L31, a cemented positive lens constructed by a negative meniscus lens L32 having a convex surface facing the object side cemented with a double convex positive lens L33, and a double convex positive lens L34. The fourth lens group G4 is composed of, in order from the object side, a cemented negative lens constructed by a positive meniscus lens L41 having a concave surface facing the object side cemented with a double concave negative lens L42, and a negative meniscus lens L43 having a concave surface facing the object side. The fifth lens group G5 is composed of, in order from the object side, a double convex positive lens L51 having an aspherical surface facing the object side, and a cemented positive lens constructed by a positive meniscus lens L52 having a concave surface facing the object side cemented with a negative meniscus lens L53 having a concave surface facing the object side.

An aperture stop S is disposed in the third lens group G3, namely, between the double convex positive lens L31 and the negative meniscus lens L32, and moved in a body with the third lens group G3 upon zooming from the wide-angle end state to the telephoto end state. Focusing from infinity to a close object is carried out by moving the second lens group G2 to the object side. Vibration reduction is carried out by moving the cemented negative lens in the fourth lens group G4 in a direction including a component substantially perpendicular to the optical axis.

Various values associated with Example 1 are listed in Table 1. In [Specifications], W denotes a wide-angle end state, M denotes an intermediate focal length state, T denotes a telephoto end state, f denotes a focal length of the zoom lens, FNO denotes an f-number, 2ω denotes an angle of view, IH denotes an image height, TL denotes a total lens length, and Bf denotes a back focal length. In [Lens Data], the left most column "i" shows the lens surface number counted in order from the object side, the second column "r" shows a radius of curvature of the lens surface, the third column "d" shows a distance to the next surface, the fourth column "vd" shows an Abbe number at d-line (wavelength λ=587.6 nm), and the fifth column "nd" shows a refractive index at d-line (wavelength λ=587.6 nm). In the fifth column "nd" refractive index of the air nd=1.000000 is omitted. In the second column "r", r=0.0000 denotes a plane surface. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

[Specifications]

|  | W | M | T |
|---|---|---|---|
| f = | 24.70 | 45.75 | 116.39 |
| FNO = | 4.12 | 4.13 | 4.14 |
| 2ω = | 85.24 | 48.96 | 20.28 |
| IH = | 21.6 | 21.6 | 21.6 |
| TL = | 146.351 | 158.339 | 190.957 |
| Bf = | 38.496 | 48.783 | 64.317 |

[Lens Data]

| i | r | d | vd | nd |
|---|---|---|---|---|
| 1 | 207.8010 | 2.000 | 23.77 | 1.846660 |
| 2 | 84.2787 | 7.595 | 67.87 | 1.593189 |
| 3 | −1502.5800 | 0.100 | | |
| 4 | 57.9483 | 5.600 | 52.29 | 1.755000 |
| 5 | 142.1986 | (d1) | | |
| *6 | 1030.3484 | 1.200 | 46.63 | 1.816000 |
| 7 | 15.8302 | 8.018 | | |
| 8 | −31.9349 | 1.000 | 45.30 | 1.795000 |
| 9 | −78.0281 | 0.100 | | |
| 10 | 60.0996 | 4.200 | 23.77 | 1.846660 |
| 11 | −33.4080 | 0.537 | | |
| 12 | −28.4260 | 1.000 | 40.94 | 1.806100 |
| *13 | 1638.3373 | (d2) | | |
| 14 | 51.6280 | 2.600 | 52.29 | 1.755000 |
| 15 | −725.4606 | 1.400 | | |
| 16 | 0.0000 | 0.500 | Aperture Stop S | |
| 17 | 30.6214 | 3.000 | 23.77 | 1.846660 |
| 18 | 17.0593 | 6.60 | 70.45 | 1.487490 |
| 19 | −88.0490 | 0.100 | | |
| 20 | 42.1543 | 3.400 | 67.87 | 1.593189 |
| 21 | −433.2258 | (d3) | | |
| 22 | −54.3056 | 3.500 | 32.35 | 1.850260 |
| 23 | −17.0745 | 1.000 | 52.29 | 1.755000 |
| 24 | 85.6576 | 3.000 | | |
| 25 | −54.2304 | 1.000 | 53.89 | 1.713000 |
| 26 | −943.5177 | (d4) | | |
| *27 | 88.1343 | 5.734 | 61.18 | 1.589130 |
| 28 | −24.2775 | 0.100 | | |
| 29 | −207.7437 | 6.509 | 70.45 | 1.487490 |
| 30 | −19.8055 | 1.000 | 32.35 | 1.850260 |
| 31 | −73.8800 | (Bf) | | |

[Lens Group Data]

| Group | I | focal length |
|---|---|---|
| G1 | 1 | 106.848 |
| G2 | 6 | −17.844 |
| G3 | 14 | 25.331 |
| G4 | 22 | −30.712 |
| G5 | 27 | 45.007 |

[Aspherical Surface Data]

Surface Number: 6

κ = 1.0000
A4 = 1.31870E−05
A6 = −3.10490E−08
A8 = 4.74440E−11
A10 = −3.43860E−14

Surface Number: 13

κ = 1.0000
A4 = −9.26690E−07
A6 = −2.12150E−08

TABLE 1-continued

A8 = 8.52640E−12
A10 = −8.74630E−14
Surface Number: 27

κ = −30.0000
A4 = −7.12220E−06
A6 = −3.55240E−09
A8 = 4.19740E−11
A10 = −1.12730E−13

[Variable Distances]

|    | W      | M      | T      |
|----|--------|--------|--------|
|    | Infinity |      |        |
| d1 | 2.899  | 17.248 | 44.501 |
| d2 | 24.017 | 11.369 | 1.199  |
| d3 | 1.779  | 5.564  | 8.842  |
| d4 | 8.342  | 4.578  | 1.300  |
|    | Close Shooting Range |  |    |
| d1 | 2.077  | 16.566 | 43.557 |
| d2 | 24.840 | 12.051 | 2.143  |
| d3 | 1.799  | 5.564  | 8.842  |
| d4 | 8.342  | 4.578  | 1.300  |

[Values for Conditional Expressions]

(1) (r2 + r1)/(r2 − r1) = 2.386
(2) (−f2)/fw = 0.722
(3) f1/|f4| = 3.479
(4) (−f2)/BFw = 0.464
(5) fw/BFw = 0.642

Figure 2A:
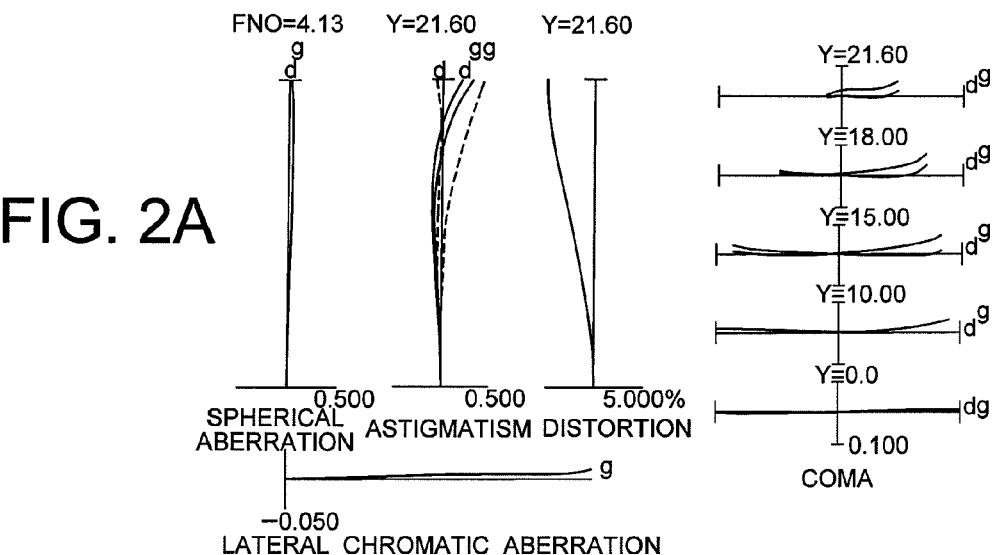
Figure 2B:
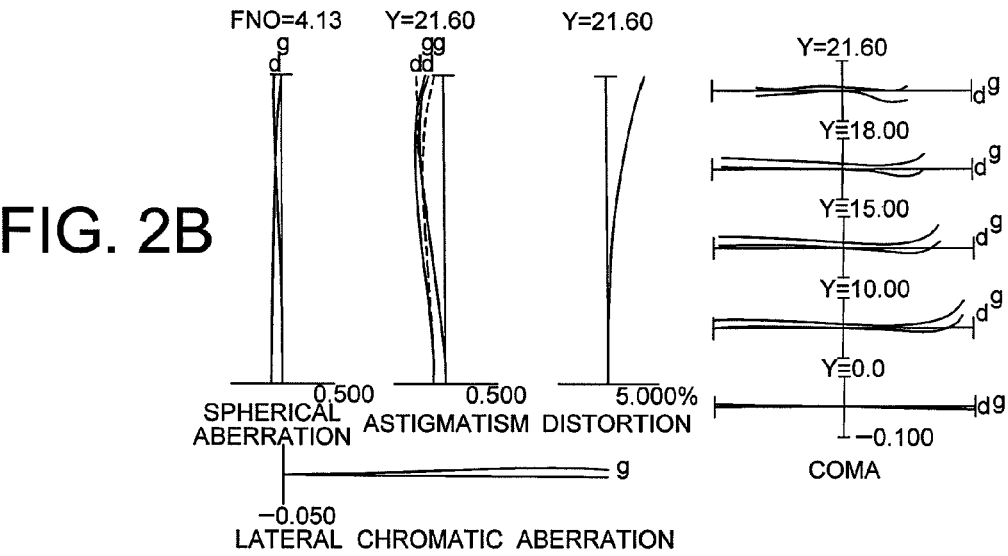
Figure 2C:
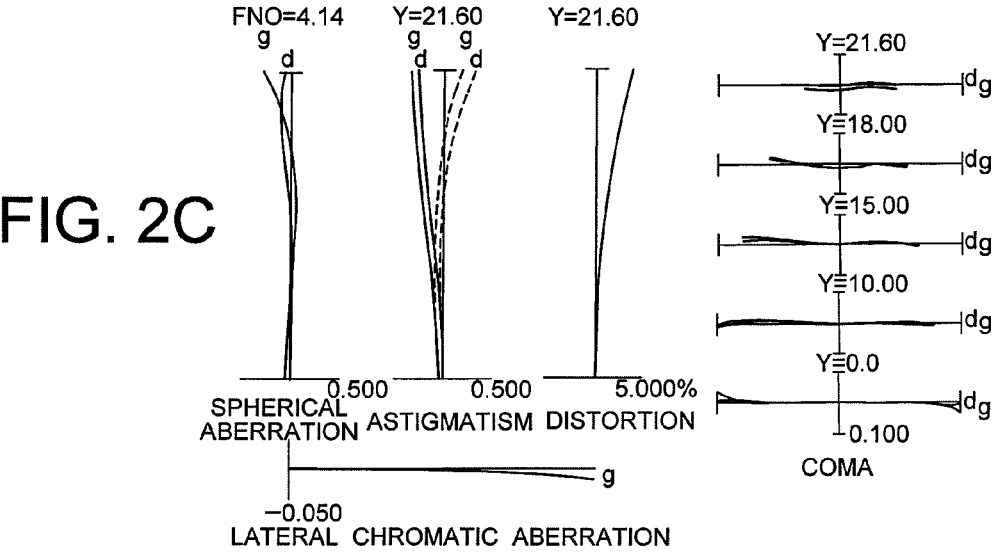

FIGS. 2A, 2B and 2C are graphs showing various aberrations of the zoom lens according to Example 1 focusing on infinity, in which FIG. 2A shows various aberrations in a wide-angle end state, FIG. 2B shows various aberrations in an intermediate focal length state, and FIG. 2C shows various aberrations in a telephoto end state. FIGS. 3A, 3B and 3C are graphs showing various aberrations of the zoom lens according to Example 1 focusing on a closest shooting range, in which FIG. 3A shows various aberrations in the wide-angle end state, FIG. 3B shows various aberrations in the intermediate focal length state, and FIG. 3C shows various aberrations in the telephoto end state. In respective graphs, FNO denotes an f-number, Y denotes an image height, d denotes d-line (wavelength λ=587.6 nm), and g denotes g-line (wavelength λ=435.6 nm). In graphs showing distortion, a solid line indicates a sagittal image plane, and a broken line indicates a meridional image plane. The above-described explanations regarding various aberration graphs are the same as the other Examples. As is apparent from the respective graphs, the zoom lens according to Example 1 shows superb optical performance as a result of good corrections to various aberrations from the wide-angle end state through the telephoto end state.

EXAMPLE 2

FIG. 4 is a sectional view showing a lens configuration of a zoom lens ZL2 according to Example 2 of the present application. In the zoom lens ZL2 shown in FIG. 4, the first lens group G1 is composed of, in order from an object side, a cemented positive lens constructed by a negative meniscus lens L11 having convex surface facing the object side cemented with a double convex positive lens L12, and a positive meniscus lens L13 having a convex surface facing the object side. The second lens group G2 is composed of, in order from the object side, a negative meniscus lens L21 having a convex surface facing the object side and an aspherical surface facing the object side, a negative meniscus lens L22 having a convex surface facing an image side, a double convex positive lens L23, and a double concave negative lens L24. The third lens group G3 is composed of, in order from the object side, a double convex positive lens L31, a cemented positive lens constructed by a double convex positive lens L32 cemented with a negative meniscus lens L33 having a concave surface facing the object side, and a cemented positive lens constructed by a negative meniscus lens L34 having a convex surface facing the object side cemented with a double convex positive lens L35. The fourth lens group G4 is composed of, in order from the object side, a cemented negative lens constructed by a double concave negative lens L41 cemented with a positive meniscus lens L42 having a convex surface facing the object side, and a negative meniscus lens L43 having a concave surface facing the object side that is an aspherical surface facing the object side. The fifth lens group G5 is composed of, in order from the object side, a double convex positive lens L51, a cemented positive lens constructed by a double convex positive lens L52 cemented with a negative meniscus lens L53 having a concave surface facing the object side, and a negative meniscus lens L54 having a concave surface facing the object side that is an aspherical surface facing the object side.

An aperture stop S is disposed between the second lens group G2 and the third lens group G3, and moved in a body with the third lens group G3 upon zooming from a wide-angle end state to a telephoto end state. Focusing from infinity to a close object is carried out by moving the second lens group G2 to the object side. Vibration reduction is carried out by moving the cemented negative lens in the fourth lens group G4 in a direction including a component substantially perpendicular to the optical axis.

Various values associated with the zoom lens ZL2 according to Example 2 are listed in Table 2.

TABLE 2

[Specifications]

|       | W       | M       | T       |
|-------|---------|---------|---------|
| f =   | 28.79   | 100.00  | 292.00  |
| FNO = | 3.57    | 5.34    | 5.96    |
| 2ω =  | 76.52   | 23.32   | 8.16    |
| IH =  | 21.6    | 21.6    | 21.6    |
| TL =  | 159.888 | 205.193 | 232.653 |
| Bf =  | 38.422  | 65.896  | 79.261  |

[Lens Data]

| i   | r          | d      | vd    | nd       |
|-----|------------|--------|-------|----------|
| 1   | 125.8687   | 2.000  | 31.27 | 1.903660 |
| 2   | 68.2116    | 9.300  | 82.56 | 1.497820 |
| 3   | −1478.5570 | 0.100  |       |          |
| 4   | 68.1452    | 6.700  | 65.47 | 1.603000 |
| 5   | 484.4905   | (d1)   |       |          |
| *6  | 590.8560   | 1.300  | 46.73 | 1.765460 |
| 7   | 18.5437    | 7.000  |       |          |
| 8   | −38.3401   | 1.000  | 46.58 | 1.804000 |
| 9   | −310.1534  | 0.100  |       |          |
| 10  | 38.1237    | 4.850  | 23.78 | 1.846660 |
| 11  | −44.8791   | 0.950  |       |          |
| 12  | −29.4340   | 1.000  | 46.58 | 1.804000 |
| *13 | 99.9238    | (d2)   |       |          |
| 14  | 0.0000     | 0.500  | Aperture Stop S | |
| 15  | 53.3960    | 3.400  | 54.66 | 1.729160 |
| 16  | −92.1030   | .100   |       |          |
| 17  | 39.7508    | 5.000  | 82.56 | 1.497820 |
| 18  | −41.4651   | 1.000  | 23.78 | 1.846660 |
| 19  | −356.7126  | 0.100  |       |          |

TABLE 2-continued

| | | | | |
|---|---|---|---|---|
| 20 | 32.9053 | 1.400 | 46.63 | 1.816000 |
| 21 | 15.5333 | 6.600 | 58.89 | 1.518230 |
| 22 | −67.2953 | (d3) | | |
| 23 | −79.1792 | 1.000 | 49.61 | 1.772500 |
| 24 | 15.8779 | 3.000 | 32.34 | 1.850260 |
| 25 | 51.8482 | 2.586 | | |
| 26 | −23.4054 | 0.190 | 38.09 | 1.553890 |
| *27 | −23.4054 | 1.200 | 54.66 | 1.729160 |
| 28 | −47.5480 | (d4) | | |
| 29 | 83.9836 | 5.600 | 60.69 | 1.563840 |
| 30 | −26.4280 | 0.300 | | |
| 31 | 59.3963 | 6.900 | 45.79 | 1.548140 |
| 32 | −21.2296 | 1.100 | 31.27 | 1.903660 |
| 33 | −43.5914 | 1.600 | | |
| 34 | −28.9812 | 1.300 | 42.64 | 1.820800 |
| *35 | −136.6351 | (Bf) | | |

[Lens Group Data]

| Group | I | focal length |
|---|---|---|
| G1 | 1 | 109.348 |
| G2 | 6 | −17.324 |
| G3 | 14 | 25.755 |
| G4 | 23 | −25.979 |
| G5 | 29 | 43.376 |

[Aspherical Surface Data]

Surface Number: 6

$\kappa = -9.1146$
$A4 = 6.35640E-06$
$A6 = -7.76870E-09$
$A8 = -2.54380E-11$
$A10 = 1.93540E-13$ Surface Number: 13

$\kappa = 1.0000$
$A4 = 1.00450E-06$
$A6 = -1.40860E-08$
$A8 = 9.73830E-12$
$A10 = 0.00000E+00$ Surface Number: 27

$\kappa = -0.2178$
$A4 = 1.55140E-06$
$A6 = 2.93820E-08$
$A8 = 1.09380E-10$
$A10 = 0.00000E+00$ Surface Number: 35

$\kappa = 1.0000$
$A4 = -8.52260E-06$
$A6 = 1.10900E-08$
$A8 = -4.80970E-11$
$A10 = 1.46300E-13$

[Variable Distances]

| | W | M | T |
|---|---|---|---|
| | Infinity | | |
| d1 | 2.534 | 37.442 | 63.214 |
| d2 | 30.341 | 13.263 | 1.585 |
| d3 | 2.961 | 6.701 | 7.803 |
| d4 | 6.152 | 2.412 | 1.310 |
| | Close Shooting Range | | |
| d1 | 1.853 | 36.751 | 59.870 |
| d2 | 31.022 | 13.954 | 4.929 |
| d3 | 2.961 | 6.701 | 7.803 |
| d4 | 6.152 | 2.412 | 1.310 |

[Values for Conditional Expressions]

(1) (r2 + r1)/(r2 − r1) = 1.282
(2) (−f2)/fw = 0.601

TABLE 2-continued (3) f1/|f4| = 4.209
(4) (−f2)/BFw = 0.451
(5) fw/BFw = 0.750

Figure 5A:
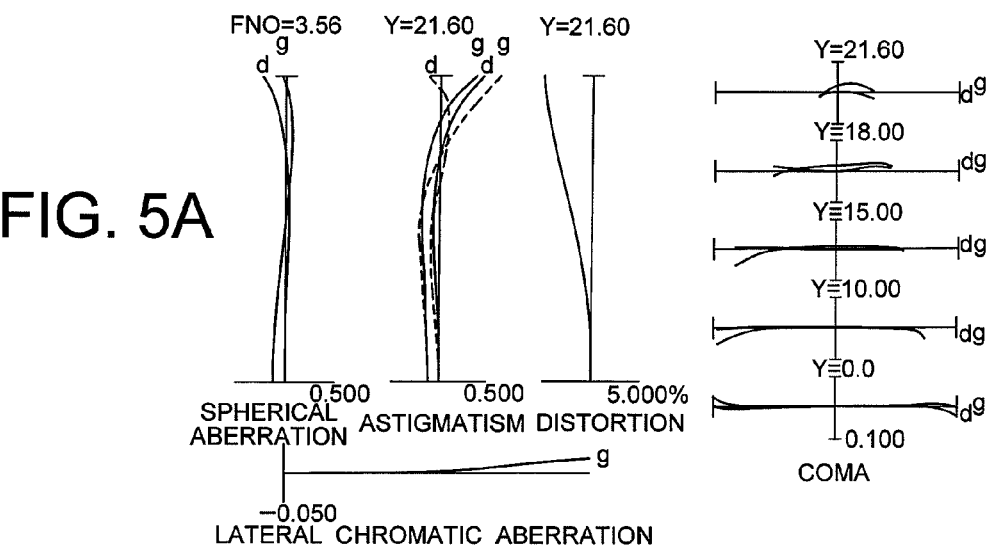
Figure 5B:
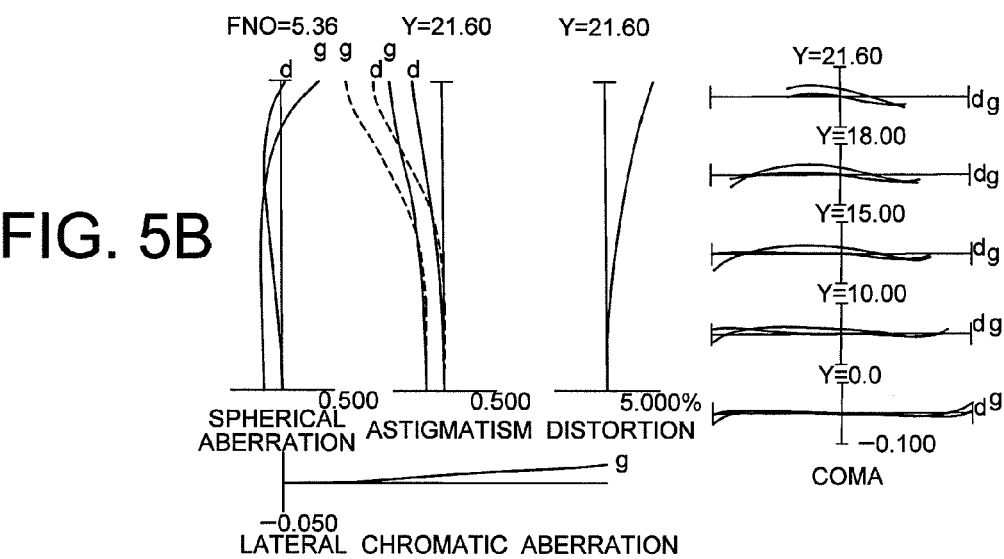
Figure 5C:
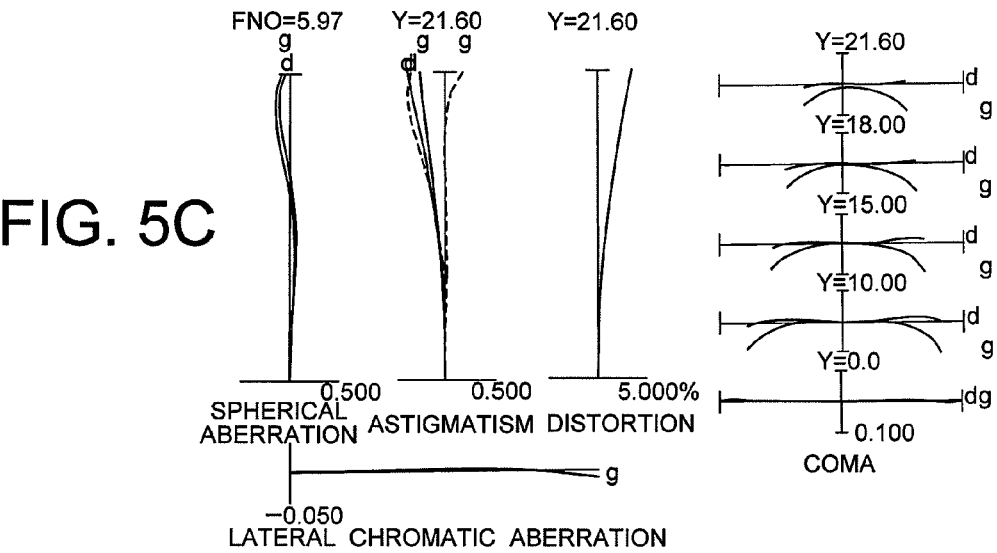
Figure 6A:
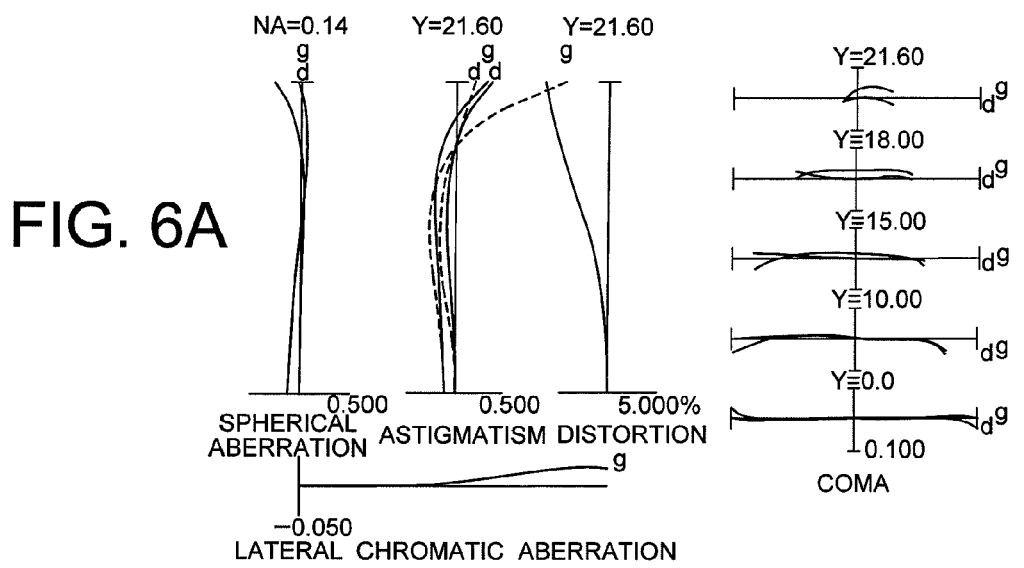
Figure 6B:
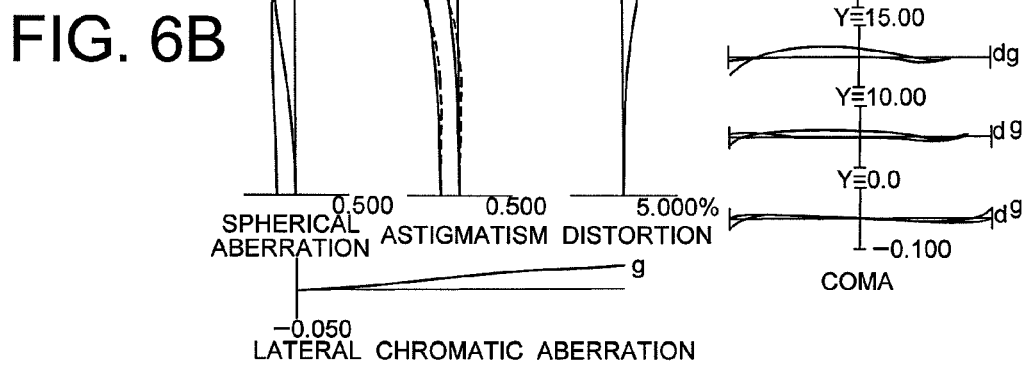
Figure 6C:
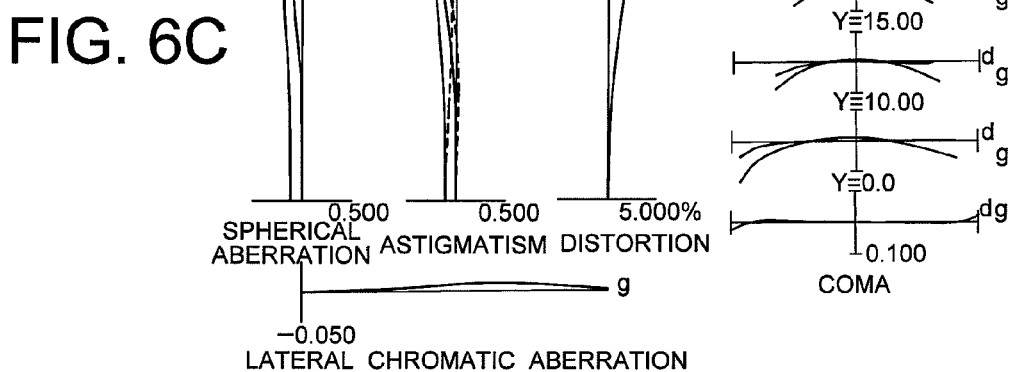

FIGS. 5A, 5B and 5C are graphs showing various aberrations of the zoom lens according to Example 2 focusing on infinity, in which FIG. 5A shows various aberrations in a wide-angle end state, FIG. 5B shows various aberrations in an intermediate focal length state, and FIG. 5C shows various aberrations in a telephoto end state. FIGS. 6A, 6B and 6C are graphs showing various aberrations of the zoom lens according to Example 2 focusing on a closest shooting range, in which FIG. 6A shows various aberrations in the wide-angle end state, FIG. 6B shows various aberrations in the intermediate focal length state, and FIG. 6C shows various aberrations in the telephoto end state. As is apparent from the respective graphs, the zoom lens according to Example 2 shows superb optical performance as a result of good corrections to various aberrations from the wide-angle end state through the telephoto end state.

EXAMPLE 3

FIG. 7 is a sectional view showing a lens configuration of a zoom lens ZL3 according to Example 3 of the present application. In the zoom lens ZL3 shown in FIG. 7, the first lens group G1 is composed of, in order from the object side, a cemented positive lens constructed by a negative meniscus lens L11 having a convex surface facing the object side cemented with a double convex positive lens L12, and a positive meniscus lens L13 having a convex surface facing the object side. The second lens group G2 is composed of, in order from the object side, a negative meniscus lens L21 having a convex surface facing the object side that is an aspherical surface facing the object side, a negative meniscus lens L22 having a convex surface facing an image side, and a cemented positive lens constructed by a double convex positive lens L23 cemented with a double concave negative lens L24 having an aspherical surface facing the image side. The third lens group G3 is composed of, in order from the object side, a cemented positive lens constructed by a negative meniscus lens L31 cemented with a double convex positive lens L32, and a cemented positive lens constructed by a double convex positive lens L33 cemented with a double concave negative lens L34. The fourth lens group G4 is composed of, in order from the object side, a cemented negative lens constructed by a double concave negative lens L41 cemented with a positive meniscus lens L42 having a convex surface facing the object side. The fifth lens group G5 is composed of, in order from the object side, a positive meniscus lens L51 having a concave surface facing the object side, and a cemented positive lens constructed by a double convex positive lens L52 cemented with a negative meniscus lens L53 having a concave surface facing the object side.

An aperture stop S is disposed between the second lens group G2 and the third lens group G3, and moved in a body with the third lens group G3 upon zooming from a wide-angle end state to a telephoto end state. A flare stopper FS is disposed between the fourth lens group G4 and the fifth lens group G5. Focusing from infinity to a close object is carried out by moving the second lens group G2 to the object side. Vibration reduction is carried out by moving the fourth lens group G4 in a direction including a component substantially perpendicular to the optical axis.

Various values associated with the zoom lens ZL3 according to Example 3 are listed in Table 3.

TABLE 3

[Specifications]

|  | W | M | T |
|---|---|---|---|
| f = | 18.39 | 56.02 | 101.99 |
| FNO = | 3.63 | 5.21 | 5.84 |
| 2ω = | 80.32 | 28.58 | 16.00 |
| IH = | 14.5 | 14.5 | 14.5 |
| TL = | 134.064 | 160.538 | 177.708 |
| Bf = | 39.008 | 57.868 | 66.008 |

[Lens Data]

| i | r | d | νd | nd |
|---|---|---|---|---|
| 1 | 209.4337 | 1.800 | 23.78 | 1.846660 |
| 2 | 79.9301 | 6.400 | 60.68 | 1.603110 |
| 3 | −294.0880 | 0.100 | | |
| 4 | 53.0478 | 4.200 | 53.89 | 1.713000 |
| 5 | 124.9384 | (d1) | | |
| *6 | 154.1371 | 0.200 | 38.09 | 1.553890 |
| 7 | 130.0000 | 1.200 | 42.72 | 1.834807 |
| 8 | 13.9274 | 6.800 | | |
| 9 | −43.5879 | 1.000 | 42.72 | 1.834807 |
| 10 | −519.1937 | 0.300 | | |
| 11 | 40.9980 | 5.000 | 23.78 | 1.846660 |
| 12 | −26.4284 | 1.000 | 42.72 | 1.834810 |
| *13 | 68.0402 | (d2) | | |
| 14 | 0.0000 | 0.600 | Aperture Stop S | |
| 15 | 64.4076 | 0.900 | 28.69 | 1.795040 |
| 16 | 34.1145 | 3.600 | 82.52 | 1.497820 |
| 17 | −31.0643 | 0.100 | | |
| 18 | 25.1181 | 2.800 | 49.61 | 1.772500 |
| 19 | −25.1181 | 0.800 | 32.35 | 1.850260 |
| 20 | 120.6588 | (d3) | | |
| 21 | −58.6499 | 0.800 | 54.66 | 1.729157 |
| 22 | 12.6352 | 2.400 | 32.35 | 1.850260 |
| 23 | 34.1595 | 3.343 | | |
| 24 | 0.0000 | (d4) | Flare Stopper FS | |
| 25 | −1531.4175 | 3.600 | 64.10 | 1.516800 |
| 26 | −24.8933 | 0.100 | | |
| 27 | 55.6770 | 6.000 | 64.12 | 1.516800 |
| 28 | −17.1260 | 1.200 | 32.35 | 1.850260 |
| 29 | −64.8623 | (Bf) | | |

[Lens Group Data]

| Group | I | focal length |
|---|---|---|
| G1 | 1 | 91.398 |
| G2 | 6 | −14.923 |
| G3 | 14 | 24.587 |
| G4 | 21 | −35.820 |
| G5 | 25 | 41.672 |

[Aspherical Surface Data]

Surface Number: 6

κ = 93.3168
A4 = 5.89740E−06
A6 = −7.29460E−08
A8 = 2.86340E−10
A10 = −7.78550E−13

Surface Number: 13

κ = 1.0000
A4 = −6.55200E−06
A6 = −7.75620E−09
A8 = −1.44920E−10
A10 = 0.00000E+00

TABLE 3-continued

[Variable Distances]

|  | W | M | T |
|---|---|---|---|
| Infinity | | | |
| d1 | 2.284 | 27.418 | 41.691 |
| d2 | 25.740 | 8.221 | 2.978 |
| d3 | 2.124 | 7.010 | 8.712 |
| d4 | 10.662 | 5.776 | 4.074 |
| Close Shooting Range | | | |
| d1 | 1.518 | 26.731 | 40.680 |
| d2 | 26.506 | 8.908 | 3.989 |
| d3 | 2.124 | 7.010 | 8.712 |
| d4 | 10.662 | 5.776 | 4.074 |

[Values for Conditional Expressions]

(1) (r2 + r1)/(r2 − r1) = 1.181
(2) (−f2)/fw = 0.811
(3) f1/|f4| = 2.552
(4) (−f2)/BFw = 0.383
(5) fw/BFw = 0.472

Figure 8A:
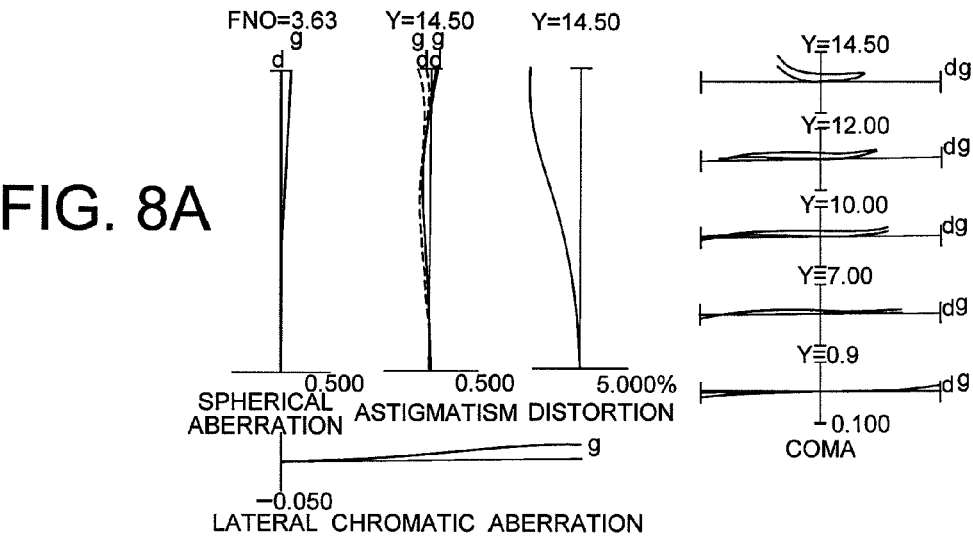
Figure 8B:
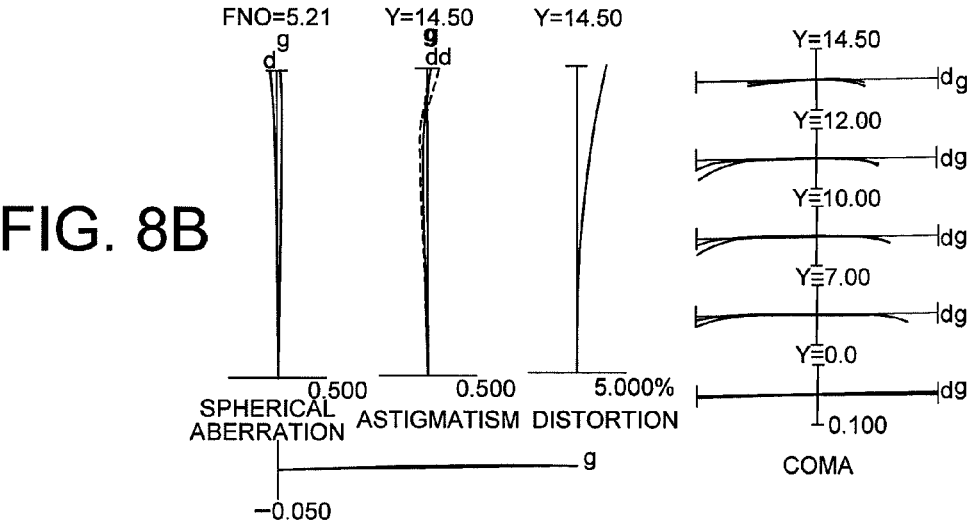
Figure 8C:
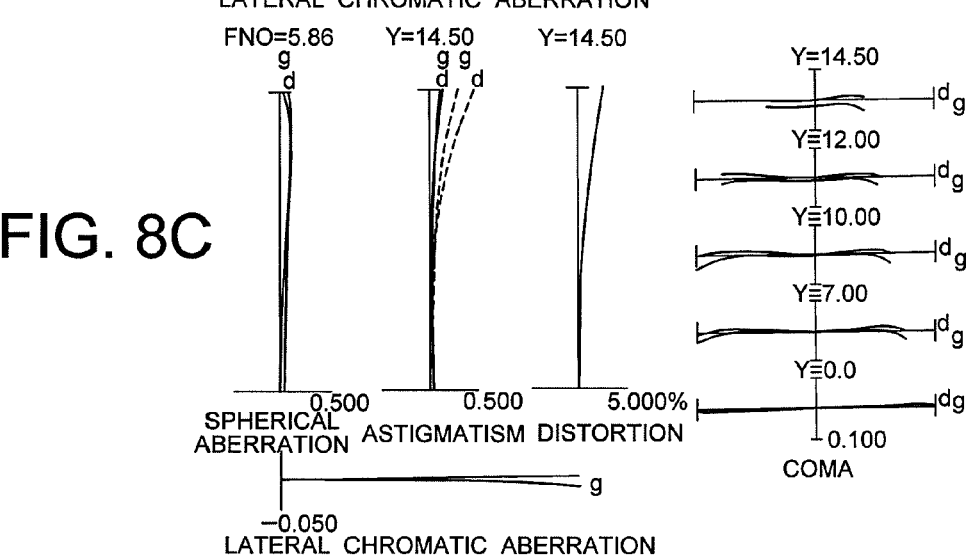
Figure 9A:
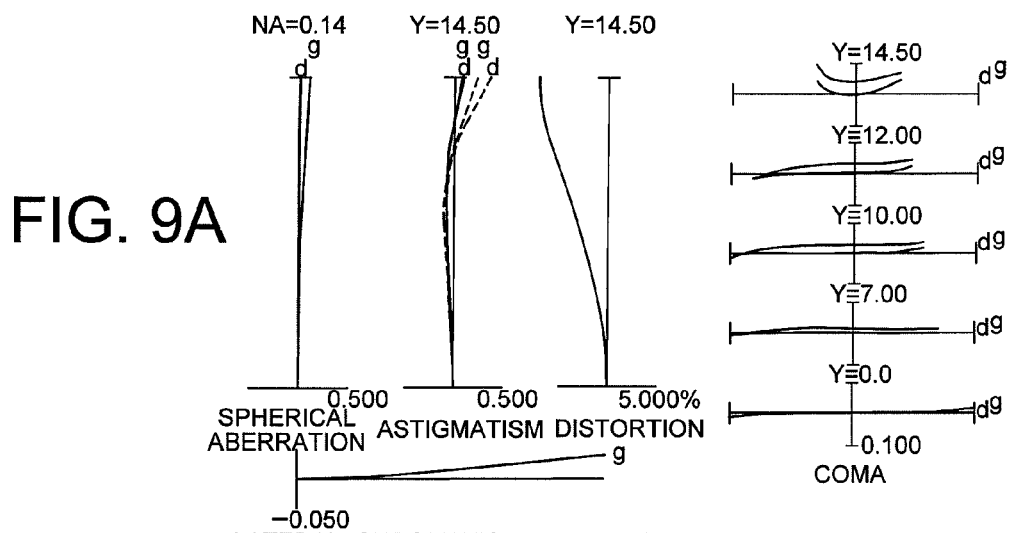
Figure 9B:
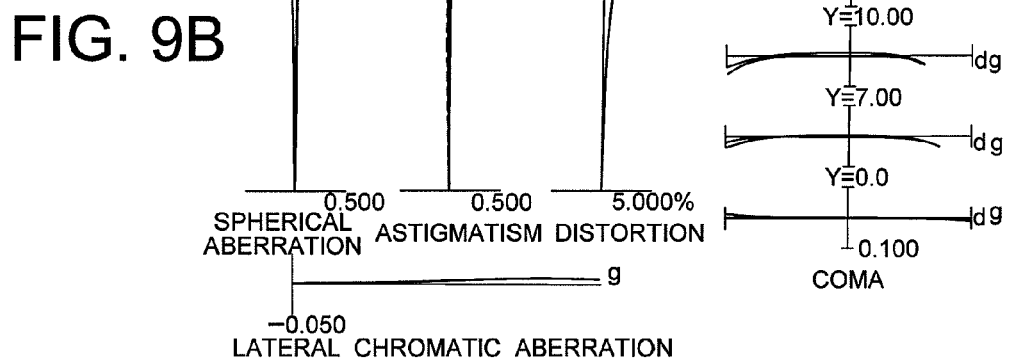
Figure 9C:
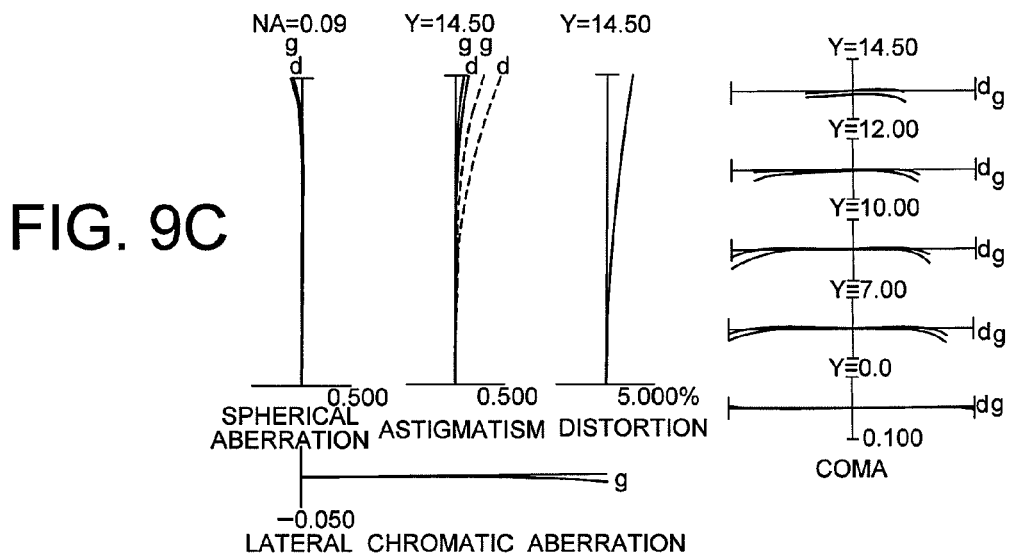

FIGS. 8A, 8B and 8C are graphs showing various aberrations of the zoom lens according to Example 3 focusing on infinity, in which FIG. 8A shows various aberrations in a wide-angle end state, FIG. 8B shows various aberrations in an intermediate focal length state, and FIG. 82C shows various aberrations in a telephoto end state. FIGS. 9A, 9B and 9C are graphs showing various aberrations of the zoom lens according to Example 3 focusing on a closest shooting range, in which FIG. 9A shows various aberrations in the wide-angle end state, FIG. 9B shows various aberrations in the intermediate focal length state, and FIG. 9C shows various aberrations in the telephoto end state. As is apparent from the respective graphs, the zoom lens according to Example 3 shows superb optical performance as a result of good corrections to various aberrations from the wide-angle end state through the telephoto end state.

EXAMPLE 4

FIG. 10 is a sectional view showing a lens configuration of a zoom lens ZL4 according to Example 4 of the present application. In the zoom lens ZL4 shown in FIG. 10, the first lens group G1 is composed of, in order from an object side, a cemented positive lens constructed by a negative meniscus lens L11 having a convex surface facing the object side cemented with a double convex positive lens L12, and a positive meniscus lens L13 having a convex surface facing the object side. The second lens group G2 is composed of, in order from the object side, a negative meniscus lens L21 having a convex surface facing the object side that is an aspherical surface facing the object side, a double concave negative lens L22, a double convex positive lens L23, and a double concave negative lens L24 having an aspherical surface facing the image side. The third lens group G3 is composed of, in order from the object side, a double convex positive lens L31, a cemented positive lens constructed by a double convex positive lens L32 cemented with a double concave negative lens 133, and a cemented negative lens constructed by a double concave negative lens L34 having an aspherical surface facing the object side cemented with a positive meniscus lens L35 having a convex surface facing the object side. The fourth lens group G4 is composed of, in order from the object side, a double convex positive lens L41 having an aspherical surface facing the object side, a cemented negative lens constructed by a double convex positive lens L42 cemented with a double concave negative lens L43, and a positive meniscus lens L44 having a concave surface facing the object side.

An aperture stop S is disposed between the second lens group G2 and the third lens group G3, and moved in a body with the third lens group G3 upon zooming from a wide-angle end state to a telephoto end state. A flare stopper FS is disposed between the third lens group G3 and the fourth lens group G4. Focusing from infinity to a close object is carried out by moving the second lens group G2 to the object side. Vibration reduction is carried out by moving a cemented lens in the third lens group G3 in a direction including a component substantially perpendicular to the optical axis.

Various values associated with the zoom lens ZL4 according to Example 4 are listed in Table 4.

TABLE 4

[Specifications]

|  | W | M | T |
| --- | --- | --- | --- |
| f = | 18.50 | 70.24 | 195.00 |
| FNO = | 3.58 | 5.11 | 5.89 |
| 2ω = | 79.78 | 22.88 | 8.44 |
| IH = | 14.5 | 14.5 | 14.5 |
| TL = | 141.720 | 183.030 | 207.403 |
| Bf = | 38.000 | 67.280 | 80.450 |

[Lens Data]

| i | r | d | vd | nd |
| --- | --- | --- | --- | --- |
| 1 | 131.6264 | 2.000 | 32.35 | 1.850260 |
| 2 | 64.5215 | 8.800 | 81.61 | 1.497000 |
| 3 | −502.5306 | 0.100 |  |  |
| 4 | 60.4775 | 6.300 | 65.47 | 1.603000 |
| 5 | 295.9384 | (d1) |  |  |
| *6 | 757.8898 | 0.150 | 38.09 | 1.553890 |
| 7 | 150.0000 | 1.200 | 46.63 | 1.816000 |
| 8 | 14.7418 | 6.500 |  |  |
| 9 | −37.4285 | 1.000 | 46.63 | 1.816000 |
| 10 | 855.9338 | 0.100 |  |  |
| 11 | 36.4002 | 4.800 | 23.78 | 1.846660 |
| 12 | −38.2802 | 0.900 |  |  |
| 13 | −25.9865 | 1.000 | 47.38 | 1.788000 |
| *14 | 250.1396 | (d2) |  |  |
| 15 | 0.0000 | 0.500 | Aperture Stop S | |
| 16 | 39.9769 | 3.000 | 65.47 | 1.603000 |
| 17 | −39.9769 | 0.100 |  |  |
| 18 | 27.0291 | 3.600 | 81.61 | 1.497000 |
| 19 | −30.9025 | 1.000 | 32.35 | 1.850260 |
| 20 | 15022.6378 | 3.000 |  |  |
| *21 | −47.6472 | 0.100 | 38.09 | 1.553890 |
| 22 | −54.8674 | 1.000 | 49.61 | 1.772500 |
| 23 | 28.9153 | 1.800 | 25.43 | 1.805180 |
| 24 | 77.8261 | 2.600 |  |  |
| 25 | 0.0000 | (d3) | Flare Stopper FS | |
| *26 | 74.7506 | 4.400 | 54.52 | 1.676974 |
| 27 | −32.8683 | 0.600 |  |  |
| 28 | 113.7229 | 4.000 | 70.24 | 1.487490 |
| 29 | −31.3823 | 1.400 | 37.17 | 1.834000 |
| 30 | 57.5744 | 1.500 |  |  |
| 31 | −127.9425 | 3.300 | 64.12 | 1.516800 |
| 32 | −27.8519 | (Bf) |  |  |

[Lens Group Data]

| Group | I | focal length |
| --- | --- | --- |
| G1 | 1 | 100.784 |
| G2 | 6 | −14.519 |
| G3 | 15 | 49.281 |
| G4 | 26 | 43.229 |

TABLE 4-continued

[Aspherical Surface Data]

Surface Number: 6

κ = 1.0000
A4 = 1.85064E−05
A6 = −5.88122E−08
A8 = 1.30157E−10
A10 = −1.19816E−13

Surface Number: 14

κ = 1.0000
A4 = 6.90787E−07
A6 = −1.55867E−08
A8 = −1.21063E−10
A10 = 7.07360E−13

Surface Number: 21

κ = 1.0000
A4 = 8.67713E−06
A6 = 2.45288E−09
A8 = 0.00000E+00
A10 = 0.00000E+00

Surface Number: 26

κ = 1.0000
A4 = −1.85346E−05
A6 = 3.98364E−09
A8 = 0.00000E+00
A10 = 0.00000E+00

[Variable Distances]

|  | W | M | T |
| --- | --- | --- | --- |
|  | Infinity | | |
| d1 | 2.070 | 38.000 | 60.000 |
| d2 | 29.400 | 11.000 | 1.800 |
| d3 | 7.500 | 2.000 | 0.400 |
|  | Close Shooting Range | | |
| d1 | 3.280 | 37.822 | 58.174 |
| d2 | 28.189 | 11.177 | 3.625 |
| d3 | 7.500 | 2.000 | 0.400 |

[Values for Conditional Expressions]

(1) (r2 + r1)/(r2 − r1) = 0.916
(2) (−f2)/fw = 0.783
(3) f1/|f4| = 2.275
(4) (−f2)/BFw = 0.390
(5) fw/BFw = 0.498

Figure 11A:
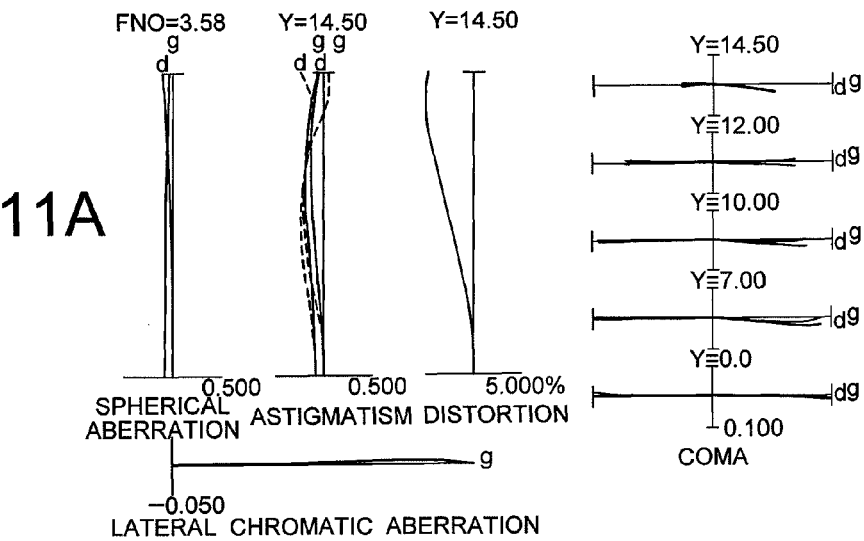
Figure 11B:
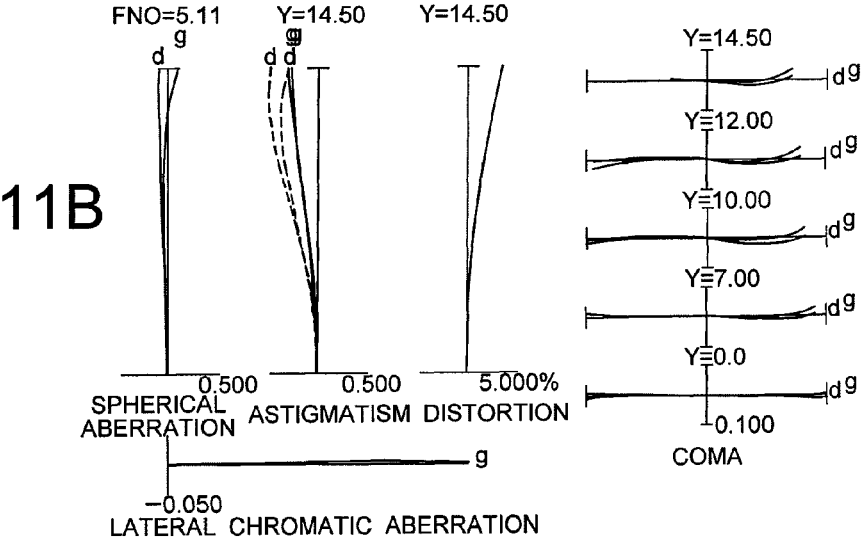
Figure 11C:
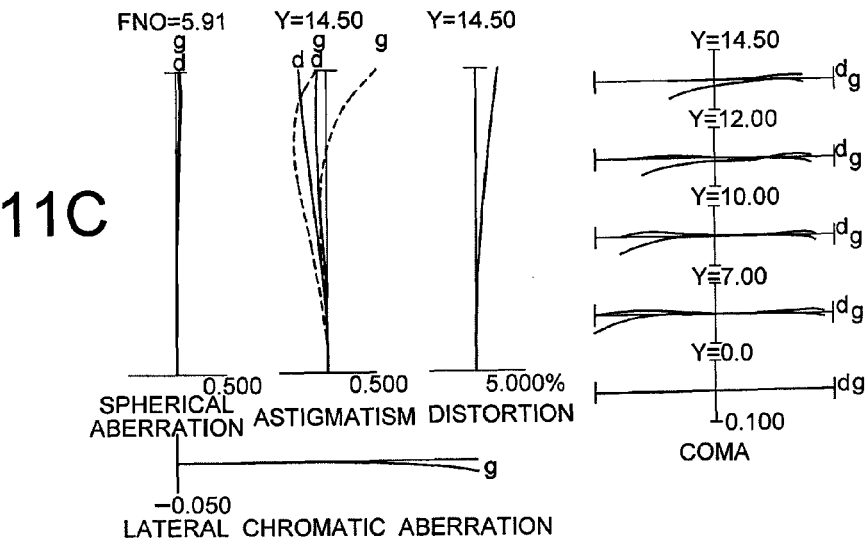
Figure 12A:
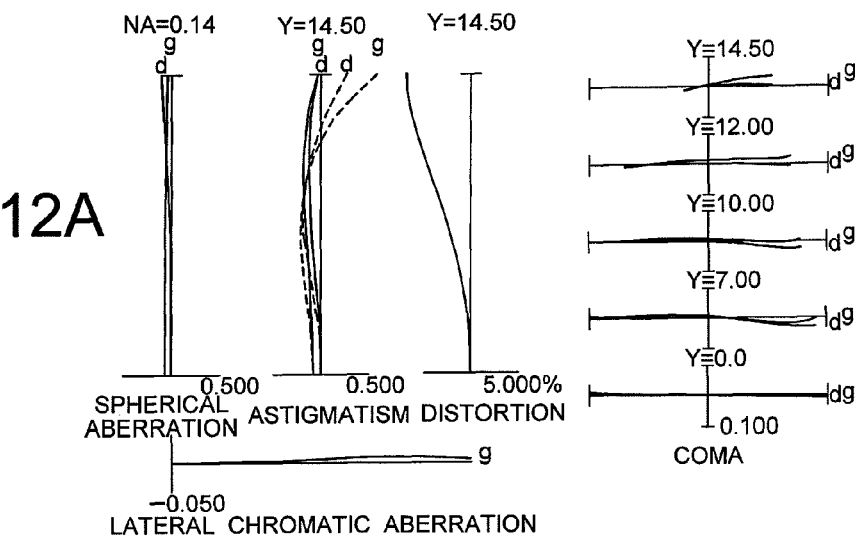
Figure 12B:
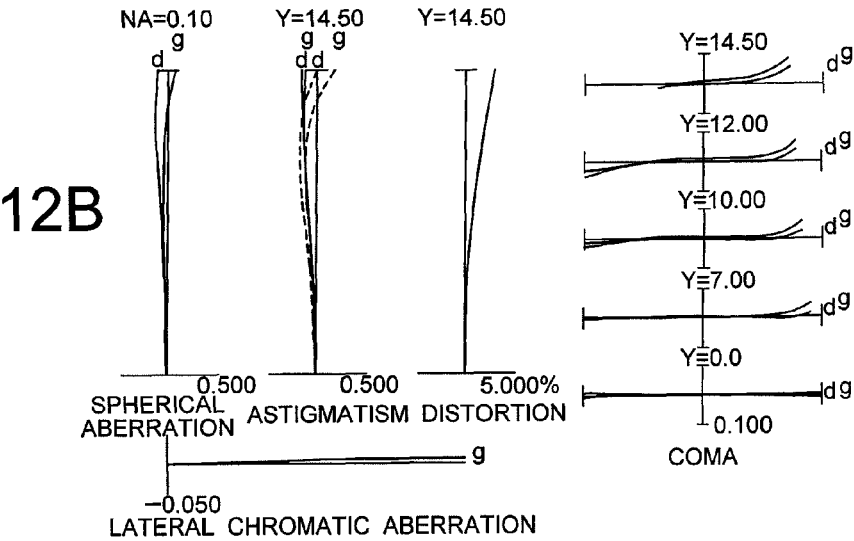
Figure 12C:
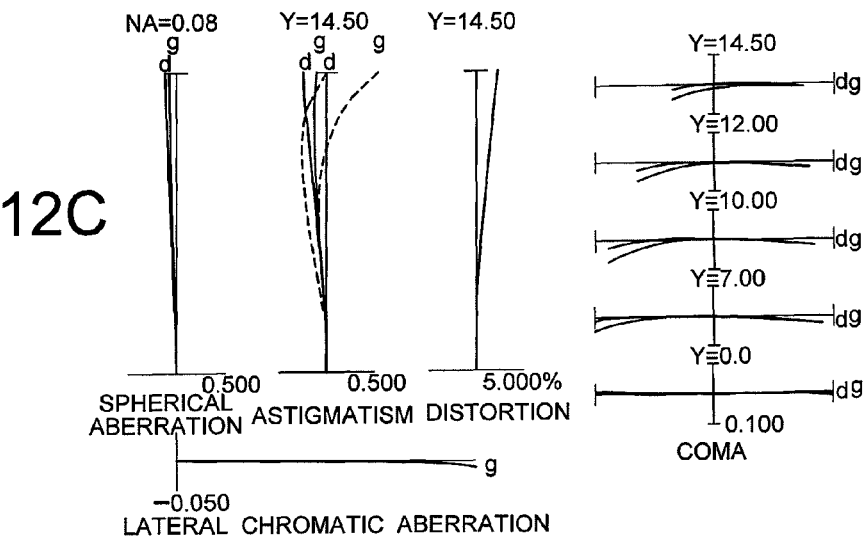

FIGS. 11A, 11B and 11C are graphs showing various aberrations of the zoom lens according to Example 4 focusing on infinity, in which FIG. 11A shows various aberrations in a wide-angle end state, FIG. 11B shows various aberrations in an intermediate focal length state, and FIG. 11C shows various aberrations in a telephoto end state. FIGS. 12A, 12B and 12C are graphs showing various aberrations of the zoom lens according to Example 4 focusing on a closest shooting range, in which FIG. 12A shows various aberrations in the wide-angle end state, FIG. 12B shows various aberrations in the intermediate focal length state, and FIG. 12C shows various aberrations in the telephoto end state. As is apparent from the respective graphs, the zoom lens according to Example 4 shows superb optical performance as a result of good corrections to various aberrations from the wide-angle end state through the telephoto end state.

Figure 13:
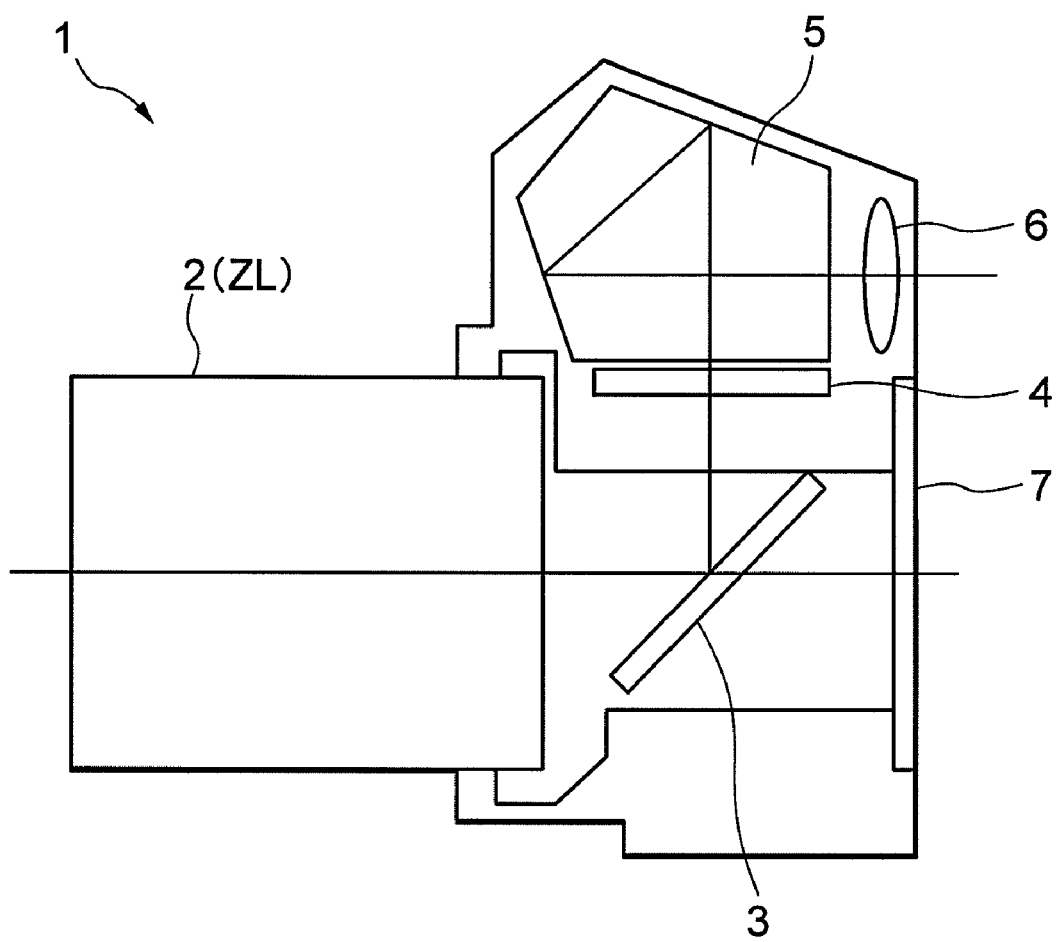
FIG. 13 is a sectional view showing a single-lens reflex digital camera equipped with the zoom lens according to the present embodiment.

A sectional view showing a single-lens reflex digital camera (hereinafter simply called as a camera) 1 as an optical apparatus equipped with a zoom lens ZL described above is shown in FIG. 13. In the camera 1, light coming out from an object (not shown) is converged by an imaging lens 2 (zoom lens ZL), reflected by a quick return mirror 3, and focused on a focusing screen 4. The light focused on the focusing screen 4 is reflected a plurality of times by a pentagonal roof prism 5, and led to an eyepiece 6. Accordingly, a photographer can observe the object image as an erected image through an eyepiece 6.

When the photographer presses a release button (not shown) all the way down, the quick return mirror 3 is retracted from the optical path, the light from the object is formed an object image on an imaging device 7. Accordingly, the light from the object is captured by the imaging device 7, and a photographed image is stored in a memory (not shown). In this manner, the photographer can take an image of an object by the camera 1. Incidentally, the camera 1 shown in FIG. 13 may removably hold the zoom lens ZL, or may be formed in a body with the zoom lens ZL. The camera may be a so-called single-lens reflex camera, or a compact camera, which does not include a quick return mirror and the like.

Incidentally, the following description may suitably be applied within limits that do not deteriorate optical performance.

Although a four-lens-group configuration or a five-lens-group configuration is shown in each Example of the present application, the present application can be applied to other lens-group configuration such as a six-lens-group configuration. Moreover, a lens configuration that a lens or a lens group is added to the object side, or a lens configuration that a lens or a lens group is added to the most image side may be possible. Incidentally, a lens group is defined as a portion having at least one lens that is separated by an air space that varies upon zooming.

In each Example, in order to vary focusing from infinity to a close object, a portion of a lens group, a single lens group, or a plurality of lens groups may be moved along the optical axis. In this case, the focusing lens group can be used for auto focus, and suitable for being driven by a motor such as an ultrasonic motor. It is particularly preferable that at least a portion of the second lens group is used as the focusing lens group.

A lens group or a portion of a lens group may be shifted in a direction having a component perpendicular to the optical axis, or tilted (fluctuated) in a plane including the optical axis as a vibration reduction lens group for correcting an image blur caused by a camera shake. It is particularly preferable that at least a portion of the third lens group is used as a vibration reduction lens group.

Moreover, any lens surface may be formed as a spherical surface, a plane surface or an aspherical surface. When a lens surface is a spherical surface or a plane surface, processing and assembly become easy, so that deterioration of optical performance caused by errors upon processing and assembling can be prevented. Even if the lens surface is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed within or in the vicinity of the third lens group G3, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

In a zoom lens ZL according to the present embodiment, the zoom ratio is about 3.5 to 15.

In a zoom lens ZL according to the present embodiment, the first lens group G1 preferably includes two positive lens components. The first lens group G1 preferably disposes lens components, in order from the object side, a positive lens component and a positive lens component with an air space in between. Or the first lens group G1 preferably includes two positive lens components and one negative lens component. The first lens group preferably disposes lens components, in order from the object side, negative-positive-positive with disposing an air space in between.

In a zoom lens ZL according to the present embodiment, the second lens group G2 preferably includes one positive lens component and three negative lens components. The second lens group G2 preferably disposes lens components, in order from the object side, negative-negative-positive-negative with disposing an air space in between. In a zoom lens ZL according to the present embodiment, the second lens group G2 preferably includes one positive lens component and two negative lens components. The second lens group G2 preferably disposes lens components, in order from the object side, negative-negative-positive with disposing an air space in between.

In a zoom lens ZL according to the present embodiment, the third lens group G3 preferably includes one positive lens component and one negative lens component. The third lens group G3 preferably disposes lens components, in order from the object side, positive-negative with disposing an air space in between. Or the third lens group G3 preferably includes two positive lens components. The third lens group G3 preferably disposes lens components, in order from the object side, positive-positive with disposing an air space in between.

In a zoom lens ZL according to the present embodiment, the fourth lens group G4 preferably includes one negative lens component.

In a zoom lens ZL according to the present embodiment, the fifth lens group G5 preferably includes two positive lens components. The fifth lens group G5 preferably disposes lens components, in order from the object side, positive-positive with disposing an air space in between.

The present embodiment only shows a specific example for the purpose of better understanding of the present invention. Accordingly, it is needless to say that the invention in its broader aspect is not limited to the specific details and representative devices.

What is claimed is:

1. A zoom lens comprising, in order from an object side:
   a first lens group having positive refractive power;
   a second lens group having negative refractive power; and
   a rear lens group having positive refractive power;
   the second lens group including at least one positive lens and a negative lens disposed adjacent to the object side of the positive lens having largest refractive power among the positive lenses,
   upon zooming from a wide-angle end state to a telephoto end state, a distance between the first lens group and the second lens group varying, and a distance between the second lens group and the rear lens group varying, and the following conditional expressions being satisfied:

$$0.80 < (r2+r1)/(r2-r1) < 3.50$$

$$0.50 < (-f2)/fw < 0.90$$

where r1 denotes a radius of curvature of the object side lens surface of the negative lens in the second lens group, r2 denotes a radius of curvature of the image side lens surface of the negative lens in the second lens group, fw denotes a focal length of the zoom lens in the wide-angle end state, and f2 denotes a focal length of the second lens group.

2. The zoom lens according to claim 1, wherein at least one portion of the second lens group moves along an optical axis upon focusing from infinity to a close object.

3. The zoom lens according to claim 1, wherein the rear lens group includes, in order from the object side, a third lens group having positive refractive power, a fourth lens group having negative refractive power, and a fifth lens group having positive refractive power.

4. The zoom lens according to claim 1, wherein the rear lens group includes, in order from the object side, a third lens group having positive refractive power, and a fourth lens group having positive refractive power.

5. The zoom lens according to claim 1, wherein the most image side lens surface of the second lens group is an aspherical surface.

6. The zoom lens according to claim 1, wherein the following conditional expression is satisfied:

$$2.00 < f1/|f4| < 6.00$$

where f1 denotes a focal length of the first lens group and f4 denotes a focal length of the fourth lens group.

7. The zoom lens according to claim 1, wherein a portion of the rear lens group moves in a direction including a component substantially perpendicular to the optical axis.

8. The zoom lens according to claim 1, wherein at least a portion of the fourth lens group moves in a direction including a component substantially perpendicular to the optical axis.

9. The zoom lens according to claim 1, wherein the most object side lens surface of the second lens group is an aspherical surface.

10. The zoom lens according to claim 1, wherein upon zooming from the wide-angle end state to the telephoto end state, a distance between the first lens group and the second lens group increases, and a distance between the second lens group and the rear lens group decreases.

11. The zoom lens according to claim 1, wherein the following conditional expression is satisfied:

$$0.30 < (-f2)/BFw < 0.60$$

where f2 denotes a focal length of the second lens group, and BFw denotes a back focal length in the wide-angle end state.

12. The zoom lens according to claim 1, wherein the following conditional expression is satisfied:

$$0.45 < fw/BFw < 0.80$$

where fw denotes a focal length of the zoom lens in the wide-angle end state, and BFw denotes a back focal length in the wide-angle end state.

13. An optical apparatus equipped with the zoom lens according to claim 1.

14. A zoom lens comprising, in order from an object:
a first lens group having positive refractive power;
a second lens group having negative refractive power; and
a rear lens group having positive refractive power;

the second lens group including at least one positive lens and a negative lens disposed adjacent to the object side of the positive lens having largest refractive power among the positive lenses, upon zooming from a wide-angle end state to a telephoto end state, a distance between the first lens group and the second lens group varying, and a distance between the second lens group and the rear lens group varying, and the following conditional expressions being satisfied:

$$0.80 < (r2+r1)/(r2-r1) < 3.50$$

$$0.30 < (-f2)/BFw < 0.60$$

$$0.45 < fw/BFw < 0.80$$

where r1 denotes a radius of curvature of the object side surface of the negative lens in the second lens group, r2 denotes a radius of curvature of the image side surface of the negative lens in the second lens group, fw denotes a focal length of the zoom lens in the wide-angle end state, f2 denotes a focal length of the second lens group, and BFw denotes a back focal length in the wide-angle end state.

15. The zoom lens according to claim 14, wherein the following conditional expression is satisfied:

$$0.50 < (-f2)/fw < 0.90$$

where fw denotes a focal length of the zoom lens in the wide-angle end state, and f2 denotes a focal length of the second lens group.

16. The zoom lens according to claim 14, wherein the rear lens group includes, in order from the object side, a third lens group having positive refractive power, a fourth lens group having negative refractive power, and a fifth lens group having positive refractive power.

17. The zoom lens according to claim 14, wherein the rear lens group includes, in order from the object side, a third lens group having positive refractive power, and a fourth lens group having positive refractive power.

18. The zoom lens according to claim 14, wherein the following conditional expression is satisfied:

$$2.00 < f1/|f4| < 6.00$$

where f1 denotes a focal length of the first lens group and f4 denotes a focal length of the fourth lens group.

19. An optical apparatus equipped with the zoom lens according to claim 14.

20. A method for manufacturing a zoom lens that includes, in order from an object side, a first lens group having positive refractive power, a second lens group having negative refractive power, and a rear lens group having positive refractive power, the method comprising steps of:

providing in the second lens group at least one positive lens and a negative lens disposed adjacent to the object side of the positive lens having largest refractive power among the positive lenses;

providing the first lens group, the second lens group and the rear lens group such that a distance between the first lens group and the second lens group varies, and a distance between the second lens group and the rear lens group varies upon zooming from a wide-angle end state to a telephoto end state;

providing the second lens group with satisfying the following conditional expressions:

$$0.80 < (r2+r1)/(r2-r1) < 3.50$$

$$0.50 < (-f2)/fw < 0.90$$

where r1 denotes a radius of curvature of the object side lens surface of the negative lens in the second lens group, r2 denotes a radius of curvature of the image side lens surface of the negative lens in the second lens group, fw denotes a focal length of the zoom lens in the wide-angle end state, and f2 denotes a focal length of the second lens group.

21. The method according to claim 20: further comprising a step of:
providing, in order from the object side, a third lens group having positive refractive power, a fourth lens group having negative refractive power, and a fifth lens group having positive refractive power into the rear lens group.

22. The method according to claim 20: further comprising a step of:
providing, in order from the object side, a third lens group having positive refractive power, and a fourth lens group having positive refractive power into the rear lens group.

23. The method according to claim 20: further comprising a step of:
providing the fourth lens group with satisfying the following conditional expression:

$$2.00 < f1/|f4| < 6.00$$

where f1 denotes a focal length of the first lens group and f4 denotes a focal length of the fourth lens group.

24. A method for manufacturing a zoom lens that includes, in order from an object side, a first lens group having positive refractive power, a second lens group having negative refractive power, and a rear lens group having positive refractive power, the method comprising steps of:
providing in the second lens group at least one positive lens and a negative lens disposed adjacent to the object side of the positive lens having largest refractive power among the positive lenses;
providing the first lens group, the second lens group and the rear lens group such that a distance between the first lens group and the second lens group varies and a distance between the second lens group and the rear lens group varies, upon zooming from a wide-angle end state to a telephoto end state;
providing the second lens group with satisfying the following conditional expressions:

$$0.80 < (r2+r1)/(r2-r1) < 3.50$$

$$0.30 < (-f2)/BFw < 0.60$$

$$0.45 < fw/BFw < 0.80$$

where r1 denotes a radius of curvature of the object side surface of the negative lens in the second lens group, r2 denotes a radius of curvature of the image side surface of the negative lens in the second lens group, fw denotes a focal length of the zoom lens in the wide-angle end state, f2 denotes a focal length of the second lens group, and BFw denotes a back focal length in the wide-angle end state.

* * * * *

UNITED STATES PATENT AND TRADEMARK OFFICE
CERTIFICATE OF CORRECTION

| | | |
|---|---|---|
| PATENT NO. | : 7,889,440 B2 | Page 1 of 1 |
| APPLICATION NO. | : 12/695327 | |
| DATED | : February 15, 2011 | |
| INVENTOR(S) | : Hiroshi Yamamoto et al. | |

It is certified that error appears in the above-identified patent and that said Letters Patent is hereby corrected as shown below:

On the Title Page:

In item (73), the Assignee information should read as follows:

(73) Assignee: NIKON CORPORATION, Tokyo (JP)

Signed and Sealed this

Seventeenth Day of February, 2015

Michelle K. Lee
*Deputy Director of the United States Patent and Trademark Office*